US008672736B1

(12) United States Patent
Nicely

(10) Patent No.: US 8,672,736 B1
(45) **Date of Patent: *Mar. 18, 2014**

(54) GAMING SYSTEM AND METHOD PROVIDING A PAI GOW DRAW POKER GAME

(71) Applicant: IGT, Reno, NV (US)

(72) Inventor: Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,075

(22) Filed: Jan. 16, 2013

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ................................ 463/13; 463/11; 273/292

(58) Field of Classification Search
USPC ......... 463/11–13, 16–20, 25, 40–42; 273/292
See application file for complete search history.

(56) References Cited

U.S. PATENT DOCUMENTS

| | | | | |
|---|---|---|---|---|
| 5,100,137 | A | 3/1992 | Fulton et al. | |
| 5,167,413 | A | 12/1992 | Fulton et al. | |
| 5,251,897 | A | 10/1993 | Fulton et al. | |
| 5,314,193 | A * | 5/1994 | Ferrer | 273/292 |
| 5,322,295 | A | 6/1994 | Cabot et al. | |
| 5,374,067 | A | 12/1994 | Jones et al. | |
| 5,377,973 | A | 1/1995 | Jones et al. | |
| 5,380,012 | A | 1/1995 | Jones et al. | |
| 5,382,025 | A | 1/1995 | Sklansky et al. | |
| 5,411,257 | A | 5/1995 | Fulton et al. | |
| 5,431,408 | A | 7/1995 | Adams et al. | |
| 5,437,451 | A | 8/1995 | Fulton et al. | |
| 5,489,101 | A | 2/1996 | Moody et al. | |
| 5,531,448 | A | 7/1996 | Moody et al. | |
| 5,636,842 | A | 6/1997 | Cabot et al. | |
| 5,732,950 | A | 3/1998 | Moody et al. | |
| 5,755,621 | A | 5/1998 | Marks et al. | |
| 5,803,809 | A | 9/1998 | Yoseloff | |
| 5,810,354 | A | 9/1998 | Banyai et al. | |
| 5,820,460 | A | 10/1998 | Fulton et al. | |
| 5,833,536 | A | 11/1998 | Davids et al. | |
| 5,882,259 | A | 3/1999 | Holmes et al. | |
| 5,911,418 | A | 6/1999 | Adams et al. | |
| 5,954,335 | A | 9/1999 | Moody et al. | |
| 5,957,774 | A | 9/1999 | Holmes et al. | |
| 6,007,066 | A | 12/1999 | Moody et al. | |
| 6,050,658 | A | 4/2000 | O'Sullivan et al. | |
| 6,062,979 | A | 5/2000 | Inoue | |

(Continued)

*Primary Examiner* — Milap Shah
(74) *Attorney, Agent, or Firm* — Neal, Gerber & Eisenberg LLP

(57) ABSTRACT

Various embodiments of the present disclosure are directed to a gaming system and method providing a Pai Gow draw poker game. For a play of a card game, the gaming system provides a player set of cards to a player and a dealer set of cards to a dealer. The gaming system enables the player and the dealer to each discard a card from their respective sets of cards. If the player discards a card from the player set, the gaming system adds a draw card to the player set. If the dealer discards a card from the dealer set, the gaming system adds a draw card to the dealer set. The gaming system then enables the player and the dealer to each form two hands using their respective sets of cards, and determines any awards based on a comparison of the player and dealer hands.

26 Claims, 23 Drawing Sheets

(56) References Cited

U.S. PATENT DOCUMENTS

| | | | |
|---|---|---|---|
| 6,098,985 | A | 8/2000 | Moody et al. |
| 6,135,883 | A | 10/2000 | Hachquet |
| 6,176,781 | B1 | 1/2001 | Walker et al. |
| 6,193,235 | B1 | 2/2001 | Vancura et al. |
| 6,196,547 | B1 | 3/2001 | Pascal et al. |
| 6,248,016 | B1 | 6/2001 | Walker et al. |
| 6,257,979 | B1 | 7/2001 | Walker et al. |
| 6,270,078 | B1 | 8/2001 | Leone et al. |
| 6,311,978 | B1 | 11/2001 | Moody |
| 6,332,839 | B2 | 12/2001 | Walker et al. |
| 6,334,613 | B1 | 1/2002 | Yoseloff |
| 6,371,484 | B1 | 4/2002 | Yuan |
| 6,386,973 | B1 | 5/2002 | Yoseloff |
| 6,406,023 | B1 | 6/2002 | Rowe |
| 6,419,578 | B1 | 7/2002 | Moody et al. |
| 6,422,940 | B1 | 7/2002 | Walker et al. |
| 6,443,455 | B1 | 9/2002 | Webb |
| 6,467,771 | B1 | 10/2002 | deKeller |
| 6,474,645 | B2 | 11/2002 | Tarantino |
| 6,474,646 | B1 | 11/2002 | Webb |
| 6,517,074 | B1 | 2/2003 | Moody et al. |
| 6,523,829 | B1 | 2/2003 | Walker et al. |
| 6,533,658 | B1 | 3/2003 | Walker et al. |
| 6,561,898 | B2 | 5/2003 | Moody |
| 6,568,680 | B1 | 5/2003 | Moody et al. |
| 6,569,014 | B2 | 5/2003 | Walker et al. |
| 6,592,456 | B2 | 7/2003 | Walker et al. |
| 6,652,377 | B1 | 11/2003 | Moody |
| 6,672,959 | B2 | 1/2004 | Moody et al. |
| 6,726,427 | B2 | 4/2004 | Jarvis et al. |
| 6,729,961 | B1 | 5/2004 | Millerschone |
| 6,793,220 | B1 | 9/2004 | Feola |
| 6,811,153 | B1 | 11/2004 | Ko |
| 6,916,245 | B1 | 7/2005 | Vancura et al. |
| 6,935,950 | B2 | 8/2005 | Tarantino |
| 6,955,356 | B2 | 10/2005 | Moody |
| 6,964,418 | B2 | 11/2005 | Moody |
| 6,969,316 | B2 | 11/2005 | Jarvis et al. |
| 6,991,538 | B2 | 1/2006 | Cannon |
| 6,994,624 | B2 | 2/2006 | Gold et al. |
| 7,056,207 | B2 | 6/2006 | Walker et al. |
| 7,059,965 | B2 | 6/2006 | Jackson |
| 7,137,628 | B2 | 11/2006 | Moody |
| 7,156,397 | B2 | 1/2007 | Moody et al. |
| 7,156,734 | B1 | 1/2007 | Walker et al. |
| 7,201,655 | B2 | 4/2007 | Walker et al. |
| 7,222,857 | B2 | 5/2007 | Moody |
| 7,222,858 | B2 | 5/2007 | Moody |
| 7,247,092 | B2 | 7/2007 | Jarvis |
| 7,297,057 | B2 | 11/2007 | Gerrard et al. |
| 7,354,344 | B2 | 4/2008 | Paulsen et al. |
| 7,364,161 | B2 | 4/2008 | Lo |
| 7,387,568 | B2 | 6/2008 | Millerschone |
| 7,390,258 | B2 | 6/2008 | Millerschone |
| 7,393,276 | B2 | 7/2008 | Millerschone |
| 7,404,762 | B2 | 7/2008 | Moody |
| 7,416,186 | B2 | 8/2008 | Walker et al. |
| 7,419,162 | B2 | 9/2008 | Lancaster et al. |
| 7,431,644 | B2 | 10/2008 | Moody |
| 7,441,778 | B2 | 10/2008 | Waken |
| 7,451,987 | B1 | 11/2008 | Feola |
| 7,455,297 | B2 | 11/2008 | Tang |
| 7,476,542 | B2 | 1/2009 | Walker et al. |
| 7,481,433 | B1 | 1/2009 | Karr et al. |
| 7,488,251 | B2 | 2/2009 | Kaminkow |
| 7,510,190 | B2 | 3/2009 | Snow et al. |
| 7,524,243 | B2 | 4/2009 | Bansemer et al. |
| 7,552,927 | B2 | 6/2009 | Moss |
| 7,614,946 | B2 | 11/2009 | Nicely |
| 7,641,197 | B2 | 1/2010 | Jackson |
| 7,658,672 | B1 | 2/2010 | Wolf et al. |
| 7,722,048 | B2 | 5/2010 | Smith et al. |
| 7,748,714 | B2 | 7/2010 | Nicely et al. |
| 7,749,059 | B2 | 7/2010 | Tarantino |
| 7,749,061 | B2 | 7/2010 | Walker et al. |
| 7,771,274 | B2 | 8/2010 | Walker et al. |
| 7,785,188 | B2 | 8/2010 | Cannon |
| 7,803,041 | B2 | 9/2010 | Gold et al. |
| 7,803,043 | B2 | 9/2010 | Jackson |
| 7,815,500 | B2 | 10/2010 | Montross et al. |
| 7,837,545 | B2 | 11/2010 | Blair, Jr. et al. |
| 7,857,693 | B1 | 12/2010 | Johnson et al. |
| 7,862,417 | B2 | 1/2011 | Nicely |
| 7,867,073 | B2 | 1/2011 | Walker et al. |
| 7,914,369 | B2 | 3/2011 | Walker et al. |
| 7,918,724 | B2 | 4/2011 | Walker et al. |
| 7,922,571 | B2 | 4/2011 | Walker et al. |
| 7,946,911 | B2 | 5/2011 | Vang et al. |
| 8,480,465 | B2 * | 7/2013 | Ennis et al. .................... 463/11 |
| 2003/0073476 | A1 | 4/2003 | Friedman |
| 2003/0114209 | A1 | 6/2003 | Ritner, Jr. et al. |
| 2003/0130024 | A1 | 7/2003 | Darby |
| 2004/0262844 | A1 | 12/2004 | Manzo et al. |
| 2005/0202863 | A1 | 9/2005 | Macaulay |
| 2005/0242506 | A1 | 11/2005 | Yoseloff |
| 2006/0030403 | A1 | 2/2006 | Lafky |
| 2006/0084505 | A1 | 4/2006 | Yoseloff et al. |
| 2006/0087080 | A1 | 4/2006 | Waken |
| 2006/0119044 | A1 | 6/2006 | Kekempanos et al. |
| 2006/0135238 | A1 | 6/2006 | Lancaster et al. |
| 2007/0054721 | A1 | 3/2007 | Jackson |
| 2007/0075494 | A1 | 4/2007 | Abbott |
| 2007/0135193 | A1 | 6/2007 | Nicely |
| 2007/0135194 | A1 | 6/2007 | Nicely et al. |
| 2007/0145684 | A1 | 6/2007 | Webb et al. |
| 2007/0205559 | A1 | 9/2007 | Webb et al. |
| 2007/0235937 | A1 | 10/2007 | Belinkoff |
| 2008/0020815 | A1 | 1/2008 | Lancaster et al. |
| 2008/0064462 | A1 | 3/2008 | Gerrard et al. |
| 2008/0070674 | A1 | 3/2008 | Lancaster et al. |
| 2008/0076500 | A1 | 3/2008 | Lancaster et al. |
| 2008/0099996 | A1 | 5/2008 | Webb |
| 2008/0111309 | A1 | 5/2008 | Nicely et al. |
| 2008/0113704 | A1 | 5/2008 | Jackson |
| 2008/0119257 | A1 | 5/2008 | Stern et al. |
| 2008/0122179 | A1 | 5/2008 | McGurk et al. |
| 2008/0188278 | A1 | 8/2008 | Paulsen et al. |
| 2008/0197571 | A1 * | 8/2008 | Okada .......................... 273/292 |
| 2008/0217856 | A1 | 9/2008 | Okada |
| 2008/0224404 | A1 | 9/2008 | Lo |
| 2008/0227514 | A1 * | 9/2008 | Yoshizawa ...................... 463/13 |
| 2008/0254847 | A1 | 10/2008 | Millerschone |
| 2009/0005144 | A1 | 1/2009 | Moody |
| 2009/0020951 | A1 | 1/2009 | Colacone |
| 2009/0104962 | A1 | 4/2009 | Nicely et al. |
| 2009/0117959 | A1 | 5/2009 | Nicely |
| 2009/0121434 | A1 | 5/2009 | Baerlocher et al. |
| 2009/0121435 | A1 | 5/2009 | Schultz |
| 2009/0124313 | A1 | 5/2009 | Nicely |
| 2009/0124315 | A1 | 5/2009 | Snow et al. |
| 2009/0124316 | A1 | 5/2009 | Baerlocher et al. |
| 2009/0124334 | A1 | 5/2009 | Jones et al. |
| 2009/0181743 | A1 | 7/2009 | Bansemer et al. |
| 2010/0004051 | A1 | 1/2010 | Walker et al. |
| 2010/0035676 | A1 | 2/2010 | Nicely et al. |
| 2010/0099480 | A1 | 4/2010 | Caputo |
| 2010/0120484 | A1 | 5/2010 | Caputo et al. |
| 2010/0120514 | A1 | 5/2010 | Caputo |
| 2010/0144415 | A1 | 6/2010 | Wolf et al. |
| 2010/0227661 | A1 | 9/2010 | Walker et al. |
| 2010/0252997 | A1 | 10/2010 | Walker et al. |
| 2010/0276886 | A1 * | 11/2010 | Smith et al. .................. 273/292 |
| 2010/0289220 | A1 | 11/2010 | Jackson |
| 2010/0331068 | A1 | 12/2010 | Walker et al. |
| 2011/0003625 | A1 | 1/2011 | Montross et al. |
| 2011/0014963 | A1 | 1/2011 | Walker et al. |
| 2011/0111818 | A1 | 5/2011 | Baerlocher |
| 2012/0068410 | A1 * | 3/2012 | Chen et al. .................... 273/292 |

* cited by examiner

300

GAMING SYSTEM AND METHOD PROVIDING A PAI GOW DRAW POKER GAME

CROSS REFERENCE TO RELATED APPLICATION

This application is related to the following commonly owned, co-pending patent application: U.S. patent application Ser. No. 13/743,082, entitled "GAMING SYSTEM AND METHOD PROVIDING A MULTIPLAYER PAI COW DRAW POKER GAME."

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

In recent years, poker games have become extremely popular. One common poker game is Pai Gow Poker. Pai Gow Poker is a variation of the Chinese domino game Pai Gow, and is played using playing cards rather than dominoes. Pai Gow Poker is typically played with a fifty-three card deck that includes fifty-two cards from a standard deck of playing cards and a single. Joker. Pai Gow Poker is also typically played at a gaming table with a physical deck of cards and a live human dealer, though Pai Gow Poker can also be played on an electronic gaming machine (EGM) using electronic cards. Generally, in Pai Gow Poker, multiple players directly compete against a dealer. Each player attempts to form two high ranking hands from a set of seven initially dealt player cards.

More specifically, a round of play of the game begins after each of the players places an initial wager. Each player is dealt seven cards. After the cards have been dealt, each player views that player's cards and arranges that player's seven cards into a five-card player hand and a two-card player hand. For a player to win, both of the player's hands must beat both of the dealer's hands (as discussed below).

In Pai Gow Poker, a player's five-card hand is evaluated similarly to how five-card hands are evaluated in a standard game of Five Card Draw Poker, with a few exceptions discussed below. For the player's five-card hand, there are ten general categories or ranks of hands, ranked from highest to lowest, as shown in Table 1 below.

TABLE 1

Ranking of Five-card Poker Hands by Category

| Rank | Hand Type | Example |
|---|---|---|
| 1 | Royal Straight Flush | A♣ K♣ Q♣ J♣ 10♣ |
| 2 | Straight Flush | K♣ Q♣ J♣ 10♣ 9♣ |
| 3 | Four-of-a-Kind | J♣ J♥ J♦ J♠ 3♣ |
| 4 | Full House | A♥ A♦ A♣ 6♦ 6♣ |
| 5 | Flush | A♣ J♣ 8♣ 6♣ 2♣ |
| 6 | Straight | 8♦ 7♣ 6♠ 5♠ 4♣ |
| 7 | Three-of-a-Kind | Q♠ Q♥ Q♦ 6♦ 2♠ |
| 8 | Two Pair | 8♦ 8♥ 5♥ 5♣ 2♠ |
| 9 | One Pair | K♦ K♠ 8♣ 7♣ 2♥ |
| 10 | High Card | A♥ 10♣ 7♦ 5♠ 3♠ |

When comparing two five-card hands, the hand with the higher-ranking hand type wins. When the two hands have the same hand type, the stronger hand is determined relative to the card ranks making up each hand, with an Ace being the highest card and a Two being the lowest card. There is no difference in rank between the four card suits. All hands can be ranked in a linear ranking from highest to lowest. Because suits are all of the same value, however, there are multiple hands that have identical rankings. For example, a Straight Flush including 5♠ 6♠ 7♠ 8♠ 9♠ is equivalent to a straight flush of all the same ranks but of a different suit, such as 5♥ 6♥ 7♥ 8♥ 9♥.

For the One Pair, Three-of-a-Kind, and Four-of-a-Kind outcomes, the hand with the highest matching rank wins. For example, a Pair of Kings beats a Pair of Tens.

For a Two Pair outcome, the hand with the higher high Pair wins. For example, a hand including 3-3-8-8 beats a hand including 5-5-7-7, since the high Pair of Eights beats the high Pair of Sevens. If the high Pair is the same, then the low Pair is compared. For example, a hand including 5-5-J-J beats a hand including 3-3-J-J because the high Pair matches and the low Pair of Fives beats the low Pair of Threes.

For a Full House, the hand with the higher Three-of-a-Kind wins. For example, a hand including K-K-8-8-8 beats a hand including A-A-5-5-5 because the three Eights beat the three Fives.

When comparing Straight, Flush, or Straight Flush hands, the hand with the highest card rank wins. For example, a 7-8-9-10-J Straight beats a 6-7-8-9-10 Straight. In Pai Gow Poker, the highest Straight is a 10-J-Q-K-A. The second highest Straight is an A-2-3-4-5. The third highest straight is a 9-10-J-Q-K.

When comparing two Flush hands, the hand with the highest ranking card wins. If both hands have the same highest ranking card rank, then the next highest card ranks are compared. This is the same way that two High Card hands are compared.

If the winning outcomes are the same between two hands, then the remaining cards in the hand are examined. For example, a hand including 5-3-3-8-8 beats a hand including 4-3-3-8-8. While the high and low Pairs both match, the remaining Five beats the Four. Likewise, a hand including 4-9-J-8-8 beats a hand including 4-6-J-8-8. The Pair of Eights match, as do the high card Jacks. Looking at the next highest cards, however, the Nine beats the Six.

For the player's two-card hand, there are only two general categories or ranks of hands, ranked from highest to lowest, as shown in Table 1 below.

TABLE 2

Ranking of Two-card Poker Hands by Category

| Rank | Hand Type | Example |
|---|---|---|
| 1 | One Pair | A♣ A♦ |
| 2 | High Card | K♣ 9♥ |

Within each of the two categories, hands are ranked according to the rank of individual cards, with an Ace being the highest card and a Two being the lowest card. The highest ranking two-card Pai Gow Poker hand is a pair of Aces (A♥ A♠), and the lowest ranking hand includes a Two-Three combination (e.g., 2♦ 3♣).

In certain Pai Gow Poker games that include a Joker card, the Joker can be used as a wild card to complete a Straight, a Flush, a Straight Flush, or a Royal Straight Flush. In the case of completing a Straight, a Flush or a Straight Flush, the Joker is assigned the highest rank possible within that context. For example, in the hand Joker Q♣ J♣ 10♣ 9♣, the Joker is evaluated as being a K♣ even though the Joker's evaluation as a 8♣ would also yield a Straight Flush. In a similar example, in the hand Joker A♣ J♣ 8♣ 6♣, the Joker is evaluated as being the largest rank available, which for his example would be the K♣. If a Joker cannot be used to complete a Straight, a Flush, a Straight Flush, or a Royal Straight Flush, the Joker is given the value of an Ace.

After each of the players has arranged the player's seven cards into a five-card player hand and a two-card player hand, the dealer arranges the seven dealer cards into a five-card dealer hand and a two-card dealer hand according to a set of rules commonly known as "House Way" rules. The "House Way" rules can vary from one gaming establishment to another, as described further below. For each of the players, after the dealer has arranged the set of seven dealer cards to form the five-card dealer hand and the two-card dealer hand, the dealer compares the five-card player hand to the five-card dealer hand and the two-card player hand to the two-card dealer hand. If both of the five-card player hand and two-card player hand beat the respective dealer hands, then the player wins an award. If both the dealer five-card hand and two-card hand beat the respective player hands, the player loses and the player's wager is forfeited. If one of the player's hands beats its respective dealer hand and the other one of the player's hands loses to its respective dealer hand, the player "pushes" on the round of play of the game and the player's wager is returned. In Pai Gow Poker, this type of a tie (i.e., one winning hand and one losing hand) occurs fairly often. If the rank of the five-card player hand is the same as the rank of the five-card dealer hand and if the rank of the two-card player hand is the same as the rank of the two-card dealer hand, the player loses the wager. This type of a tie-tie situation is sometimes referred to as a copy.

Under certain Pai Gow Poker house rules, if the player wins, the house takes a defined percentage of the player's award (known as a commission, a vigorish, or a "vig"). In other variations of Pai Gow Poker, such as Pai Gow Peek Poker and EZ Pai Gow Poker, there is no commission, vigorish, or "vig" taken by the house if the player wins.

In Pai Gow Poker, there are several rules or restrictions that dictate how a player must form the player's five-card and two-card hands. For example, the two-card player hand must rank lower than the five-card player hand. For example, if both the two-card hand and the five-card hand are of the type One Pair, the two-card hand is not allowed to have a higher ranking pair than the five-card hand. Similarly, if both the two-card hand and the five-card hand are of the hand type High Card, the two-card hand is not allowed to have a higher ranking high card than the five-card hand. However, if the five-card hand is of the hand type Two Pair and the two-card hand is of the hand type One Pair, the pair in the two-card hand can be of a higher rank than either pair within the five-card hand because the five-card hand is of a higher ranking hand type. If a player mistakenly sets the two-card player hand to have a higher rank than the five-card player hand (e.g., a five-card hand having only a High Card ranking, such as A♥ K♠ 9♥6♣ 4♦, and a two-card hand having a Pair, such as Q♥ Q♣), then both hands are determined to be "foul." When the game is offered on a physical table with a live dealer, certain gaming establishment rules will result in a "foul" hand automatically losing. When the game is offered on an EGM, the EGM typically warns the player of the attempt at setting a foul hand and prompts the player to correct the player's setting. In an EGM that supports multiplayer play, a time limit may be established. If a given player is unable to set the player's hand within an allotted period of time, the EGM will set the player's hand on the player's behalf according to the House Way rules.

In certain gaming establishments, a player may request that the dealer set the player's hand according to house way rules. When the game is offered at a physical table with a live dealer, the setting of a player hand is typically handled as follows. A player places the cards face-down in a single stack and announces to the dealer the desire for the dealer to set that hand. After all other players at the table have set their own hands, the dealer will assist any players requesting house setting one at a time. For a given player, the dealer will reveal that player's cards, set the cards according to the House Way rules, and then place the cards in the areas that the player would normally do so himself or herself. Casinos typically use this order of operation to prevent players from seeing any cards other than their own before setting their own hands, as casinos are concerned that an expert player may be able to achieve an advantage against the casino if the player is able to deduce what cards the dealer holds by a process of elimination regarding revealed player cards.

Under certain Psi Gow Poker gaming configurations, a player may elect to act as the banker. When a player plays the role of the banker, the player competes against the other player or players at the table. If the player who is playing the role of banker wins, the player-banker wins an award and a commission based on the winnings is paid to the house. Under certain game rules, when a player is acting the role of banker, the dealer still participates in the game. In general, the opportunity for player to play the role of banker rotates around the table. Alternatively, the opportunity to play the role of the banker may alternate between player and dealer between each round of play. As mentioned above, however, the players may alternatively elect to decline this option. If a player elects to play the role of the banker, the player must have enough money to pay losses to the other players and the dealer assuming that the player/banker loses to all of the other players and the dealer.

One factor in determining a player's odds of beating the dealer (or other player-banker) is based upon the way in which a player arranges the player's cards to form the five-card player hand and the two-card player hand. That is, there are many ways that a player could set the player's cards without having "foul" hands, but there are card setting strategies that can optimize the player's probability of beating the dealer. In certain known Pai Gow Poker games, whether the games are operated on an EGM or dealt by a live human dealer, the games include the following characteristics: (a) the cards in the dealer hand are set according to a set of "House Way" rules, and (b) a player can either set theft own cards according to the rules of the game or can request to have the dealer set the cards in the player's hand according to the "House Way" rules. In general, the "House Way" rules are not the same as optimal play rues. "House Way" rules are generally simplified rules relative to optimal play rules because the simplified rules are not overly complex and enable a human dealer to learn, remember, and execute simple rules to reduce the chance of dealer errors and to reduce the chance of player disputes.

The "House Way" rules can differ based on the preferences of the gaming establishment, local gaming regulations, regional customer preferences, and/or other factors. One example of a set of "House Way" rules for setting the dealer hands is outlined below. As mentioned above, the dealer receives seven cards and must divide the seven cards into a five-card dealer hand and a two-card dealer hand, where the five-card dealer hand must have a higher rank than the two-card dealer hand.

Under this example set of "House Way" rules, if the seven dealer cards do not include a pair (e.g., A♥, K♠, J♣, 8♥, 6♠, 4♦ and 3♣), the dealer must place the highest value card (A♥) in the five-card dealer hand and must place the next two highest cards (K♠ J♣) in the two-card dealer hand. A hand such as this, whether it be a player hand or a dealer hand, that does not include a pair or better is often referred to as a "Pai Gow." By placing the highest value card in the five-card dealer hand, the hands are not "foul." Moreover, even assuming that the dealer will lose the five-card dealer hand, placing the next two highest cards in the two-card dealer hand will maximize the probability that the dealer will win at least one of the two hands and tie the player(s) (i.e., a "push" outcome). Certain "House Way" rules are configured to maximize the probability that the dealer will tie the player (i.e., that the dealer will have one winning hand and one losing hand).

If the seven dealer cards include one pair (e.g., A♠, K♠, J♣, J♥, 6♠, 4♦, and 3♣), the dealer must place the pair (J♣ J♥) in the five-card dealer hand and the next two highest value cards (A♠ K♠) in the two-card dealer hand. In this example rule, the Ace and the King are more useful in the two-card dealer hand, and would not significantly affect or improve the rank of the five-card dealer hand.

If the seven dealer cards include two pairs, the dealer must place both of the pairs in the five-card dealer hand except in the following circumstances:

(a) if one of the pairs is Sevens or greater and there are no singleton Aces (i.e., a non-paired Ace), then place the higher pair in the five-card dealer hand and the lower pair in the two-card dealer hand;
(b) if one of the pairs is Jacks or better, if the other of the pairs is Sixes or better, and there is a singleton Ace, then place the higher pair in the five-card dealer hand and the lower pair in the two-card dealer hand; and
(c) if one of the pairs is a pair of Aces, then place the pair of Aces in the five-card dealer hand and the lower pair in the two-card dealer hand. In this case, because the pair of Aces is already a high pair (and relatively high ranking five-card hand) the benefit of placing the lower pair in the two-card dealer hand exceeds the detriment of sacrificing a Two Pair hand as the five-card dealer hand.

If the seven dealer cards include three pairs (e.g., A♥, A♣, 10♥, 10♠, 6♣, 6♦, and J♥) always place the highest ranking pair (A♥, A♣) in the two-card dealer hand and place the remaining two pair (10♥ 10♠ and 6♣ 6♦) in the five-card dealer hand.

If the seven dealer cards include a Three-of-a-Kind, the dealer must place the Three-of-a-Kind in the five-card dealer hand unless the Three-of-a-Kind includes three Aces. If the Three-of-a-Kind includes Aces, place a pair of Aces in the five-card dealer hand, and place the third Ace in the two-card dealer hand.

If the seven dealer cards include a Full House (e.g., K♠, K♦, K♣, 4♦, 4♠, 9♦ and 7♣), the dealer must split the Full House into a Three-of-a-Kind (K♠, K♦, K♣) and a pair (4♦, 4♠) with the Three-of-a-Kind being placed in the five-card dealer hand. This rule has the following exceptions:

(a) if the Full House include a pair of Twos, the Full House does not need to be split up; and
(b) if the remaining two-cards of the seven dealer cards are an Ace and a King, the Full House does not need to be split up.

If the seven dealer cards include a Full House with a Three-of-a-Kind and two pairs (e.g., K♠, K♦, K♣, 4♦, 4♠, 9♦, and 9♣), the dealer must place the higher of the two pairs (i.e., 9♦ 9♣) in the two-card dealer hand. In this example hand, a Full House is likely to beat most five-card player hands. Therefore, the marginal benefit of having a higher pair in the five-card dealer hand is less than the marginal benefit of having a higher pair in the two-card dealer hand. In a single deck game having only four Kings, it would not be possible for another player to be dealt three Kings because the deck includes only one remaining King. Therefore, because no other player could be dealt a Full House including three Kings, there is no marginal benefit to having a higher second pair in the five-card dealer hand.

If the seven dealer cards include two separate Three-of-a-Kinds (e.g., J♥, J♦, J♣, 2♥, 2♠, 2♣, 6♦), the higher ranking of the two Three-of-a-Kinds (i.e., J♥, J♦, J♣) should be split up and the pair of Jacks should be placed in the two-card dealer hand. In the example above, the final five-card dealer hand would include 2♥ 2♠ 2♣ J♥ 6♦, and the final two-card dealer hand would include J♦ J♣. Because a Three-of-a-Kind is a relatively high ranking hand, the marginal benefit of having a higher ranking pair (e.g., J♥ J♦ instead of 2♥ 2♠) is greater than the marginal benefit of having a higher valued Three-of-a-Kind. Moreover, the marginal benefit of forming a Full House in the five-card dealer hand (e.g., J♥ J♦ J♣ 2♥ 2♠) is not high enough to forego forming a pair in the two-card dealer hand.

If the seven dealer cards include a Straight, a Flush, a Straight Flush, or a Royal Straight Flush, the dealer uses these five cards in the five-card dealer hand except in the following circumstances in which the seven dealer cards also include two pairs:

(a) if the seven dealer cards include an Ace singleton (e.g., the following hand includes Two Pair, a Hearts Flush, and an Ace singleton: A♥ K♥ K♦ 10♥ 10♣ 9♥ 3♥);
(b) if the seven dealer cards include a pair of Jacks and a pair of Sixes (e.g., A♥ J♥ J♦ 6♥ 6♣ 9♥ 3♥); and
(c) if the seven dealer cards include a pair of Aces and any other pair (A♥ A♦ K♥ 10♥ 8♥ 3♦ 3♥.

If the seven dealer cards include a six or seven card Straight or Flush (e.g., K♥ Q♥ J♦ 10♣ 9♣ 8♥ 7♥), form the highest possible two-card dealer hand (K♥ Q♥) while maintaining the Straight or Flush in the five-card dealer hand (J♦ 10♣ 9♣ 8♥ 7♥). If the seven dealer cards include a Straight Rush (e.g., J♥ 10♥ 9♥ 8♥ 7♥ 4♥ 2♣), form only a Straight or Rush in the five-card dealer hand if the two-card dealer hand can be made to include a Jack or higher. In the example above, the five-card dealer hand should be set to include a Rush (10♥ 9♥ 8♥ 7♥ 4♥), and the two-card dealer hand should be set to include the J♥ and 2♣. If the seven dealer cards include a Royal Straight Rush (e.g., A♥ K♥ Q♥ J♥ 10♥ 6♥ 2♣), form only a Straight or Rush in the five-card dealer hand if the two-card dealer hand can be made to include an Ace or higher. In the example above, the five-card dealer hand should be set to include a Rush (K♥ Q♥ J♥ 10♥ 6♥), and the two-card dealer hand should be set to include the A♥ and 2♣.

If the seven dealer cards include a Four-of-a-Kind, whether to split the Four-of-a-Kind into two separate pairs is determined according to the rank of the Four-of-a-Kind as follows:

(a) if the rank is a Two through Six (e.g., 4♥ 4♦ 4♠ 4♣ J♥ 10♠ 2♥), always keep the Four-of-a-Kind together;
(b) if the rank is Seven through Ten, split the Four-of-a-Kind into two pairs unless an Ace or better can be played in the two-card dealer hand;
(c) if the rank is a Jack through King, split the Four-of-a-Kind into two pairs unless the hand also includes a pair of Tens or higher (e.g., the Four-of-a-Kind in the following hand should not be split: J♥ J♦ J♠ J♣ 10♥ 10 ♠ 2♥); and (d) if the rank is Aces, split unless the seven dealer cards also include a pair of Sevens or higher (e.g., the Four-of-a-Kind in the following hand should not be split: A♥ A♦ A♠ A♣ 7♥ 7♠ 2♥).

Finally, if the seven dealer cards include five Aces, split the five Aces up (i.e., three Aces in the five-card dealer hand and two Aces in the two-card dealer hand) unless a pair of Kings can be played in the two-card dealer hand (e.g., the five Aces in the following hand should not be split: A♥ A♦ A♠ A♣ K ♠ K♥).

As mentioned above, although the above example of "House Way" rules has been explained, the "House Way" rules can differ from gaming establishment to gaming establishment. For instance, in a second example of "House Way" rules, the rules for splitting Two Pair differ slightly from the first example of "House Way" rules described above. In this second example set of "House Way" rules, if the seven dealer cards include Two Pair, the pairs are split except in the following situations:

(a) if both of the pairs are of a rank of six or less;

(b) if both of the pairs are of a rank of ten or less and there is an Ace singleton; and (c) if one pair is a rank of Jack or greater, one pair is a rank of five or less, and there is an Ace singleton.

Various players continually seek out new and different variations to card games such as Pai Gow Poker. A continuing need thus exists for gaming systems and methods that provide new, exciting, and engaging card games.

SUMMARY

Various embodiments of the present disclosure are directed to a gaming system and method providing a Pai Gow draw poker game. Generally, for a play of a card game in certain embodiments, the gaming system provides a set of cards to both a player and a dealer. The gaming system enables both the player and the dealer to each discard at least one card from their respective sets of cards and to each add at least one draw card to their respective sets of cards. The order in which cards are discarded and added may differ between the player and the dealer. After any cards are discarded from the sets and any draw cards are added to the sets, the gaming system enables the player and the dealer to each form two hands using their respective sets of cards. In this embodiment, the gaming system determines any awards based on a comparison of the player and dealer hands according to the Pai Gow rules.

More specifically, in one example single player embodiment, the gaming system is configured to operate a card game associated with a plurality of cards. For a play of the card game for a player, the gaming system determines a player set of at least two cards from the plurality of cards. The gaming system displays face-up the cards of the player set. The gaming system determines a dealer set of at least two cards from the plurality of cards. The gaming system enables the player to discard at least one of the cards of the player set and, accordingly, receives a discard input associated with at least one of the cards of the player set.

The gaming system replaces each card of the player set associated with the received discard input with a player draw card from the plurality of cards. In other words, for each card of the player set associated with the received discard input, the gaming system removes that card from the player set, determines a player draw card from the plurality of cards, and adds the player draw card to the player set. The gaming system enables the player to form a first player hand and a second player hand using the cards of the player set and, accordingly, receives hand formation inputs associated with the cards of the player set. The gaming system forms the first player hand and the second player hand using the cards of the player set based on the received hand formation inputs.

The gaming system displays face-up the cards of the dealer set. The gaming system adds at least one dealer draw card from the plurality of cards to the dealer set. Put differently, the gaming system determines at least one dealer draw card from the plurality of cards and adds the at least one dealer draw card to the dealer set. The gaming system then discards at least one of the cards of the dealer set based on one or more rules or conditions. In one example, the gaming system determines all possible combinations of two-card and five-card hands formed from the cards of the dealer set, and determines which cards to discard based on which of the combinations of two-card and five-card hands first maximizes the value of the two-card hand and then maximizes the value of the five-card hand (i.e., determines to discard whichever cards of the dealer set that are not included in that two-card hand or that five-card hand). In another example, the gaming system discards the least valuable card(s) or the card(s) least likely to be included in the two dealer hands. The gaming system forms a first dealer hand and a second dealer hand using the cards of the dealer set based on one or more rules or conditions (such as a set of "House Rules"). The gaming system determines any awards based on a comparison of the first and second player hands with the first and second dealer hands, respectively, and displays and provides any determined awards.

In one example multiplayer embodiment, the gaming system includes a plurality of EGMs. For a play of the card game, for each EGM, the gaming system determines a player set of at least two cards from a plurality of cards for a player of that EGM. For each EGM, the gaming system displays face-up the cards of the player set of the player of that EGM. For each EGM, the gaming system enables the player of that EGM to discard up to a designated quantity of the cards of the player set of that player and, accordingly, receives a discard input associated with up to the designated quantity of the cards of the player set.

For each EGM, the gaming system removes each card associated with the received discard input from the player set of the player of that EGM. The gaming system determines and displays face-up a quantity of community cards from the plurality of cards. For each EGM, the gaming system enables the player of that EGM to form a first player hand and a second player hand using the cards of the player set and at least one of the community cards and, accordingly, receives hand formation inputs associated with the cards of the player set and at least one of the community cards. For each EGM, the gaming system forms the first player hand and the second player hand for the player of that EGM using the cards of the player set and at least one of the community cards based on the received hand formation inputs.

The gaming system determines a dealer set of at least two cards from the plurality of cards. The gaming system displays face-up the cards of the dealer set. The gaming system adds at least one dealer draw card from the plurality of cards to the dealer set. Put differently, the gaming system determines at least one dealer draw card from the plurality of cards and adds the at least one dealer draw card to the dealer set. The gaming system then discards at least one of the cards of the dealer set based on one or more rules or conditions. The gaming system forms a first dealer hand and a second dealer hand using the cards of the dealer set based on one or more rules or conditions (such as a set of "House Rules"). For each EGM, the gaming system determines any awards for the player of that EGM based on a comparison of the first and second player hands of the player of that EGM with the first and second dealer hands, respectively, and displays and provides any determined awards.

In certain embodiments, a commission, vigorish, or "vig" is deducted from any determined awards before those awards are provided to the player.

Thus, in various embodiments, the gaming system of the present disclosure is configured to provide new, exciting, and engaging variations of card games that increase the number of potentially interesting player decisions per game and that provide an additional instance of player anticipation, thereby increasing player enjoyment and entertainment.

Additional features and advantages are described herein, and will be apparent from, the following Detailed Description and the Figures.

DETAILED DESCRIPTION

Pai Gow Draw Poker Game

Various embodiments of the present disclosure are directed to a gaming system and method providing a Pai Gow draw poker game. While the card game of the present disclosure is a primary game in the embodiments described below, it should be appreciated that the card game may additionally or alternatively be employed as or in association with a secondary game or a bonus game. Moreover, while the credit balances, the wagers, and the awards are each displayed as an amount of monetary credits or currency in the embodiments described below, one or more of such credit balances, such wagers, and such awards may be for non-monetary credits, promotional credits, and/or player tracking points or credits.

While the embodiments of the card game described below are described as being operated on a gaming system, such as an EGM, it should be appreciated that the card game of the present disclosure may be provided at a physical card table. In certain such embodiments, the card game is dealt by a human dealer using physical playing cards. In certain such embodiments, the physical card table includes an embedded processor and electronic display. In some variations, each player has an individual display to support functions such as banking, wagering, and viewing of status. In other variations, the physical card table includes a dealer display that is configured to, for instance, indicate to the dealer information such as which card(s) to discard, how to form final hands, which players to pay, and the like. In other such embodiments, the card game is provided at a "smart table" that employs a display device (such as a display device including a touch screen, as further described below) for each player that is configured to display electronic playing cards.

Figure 1:
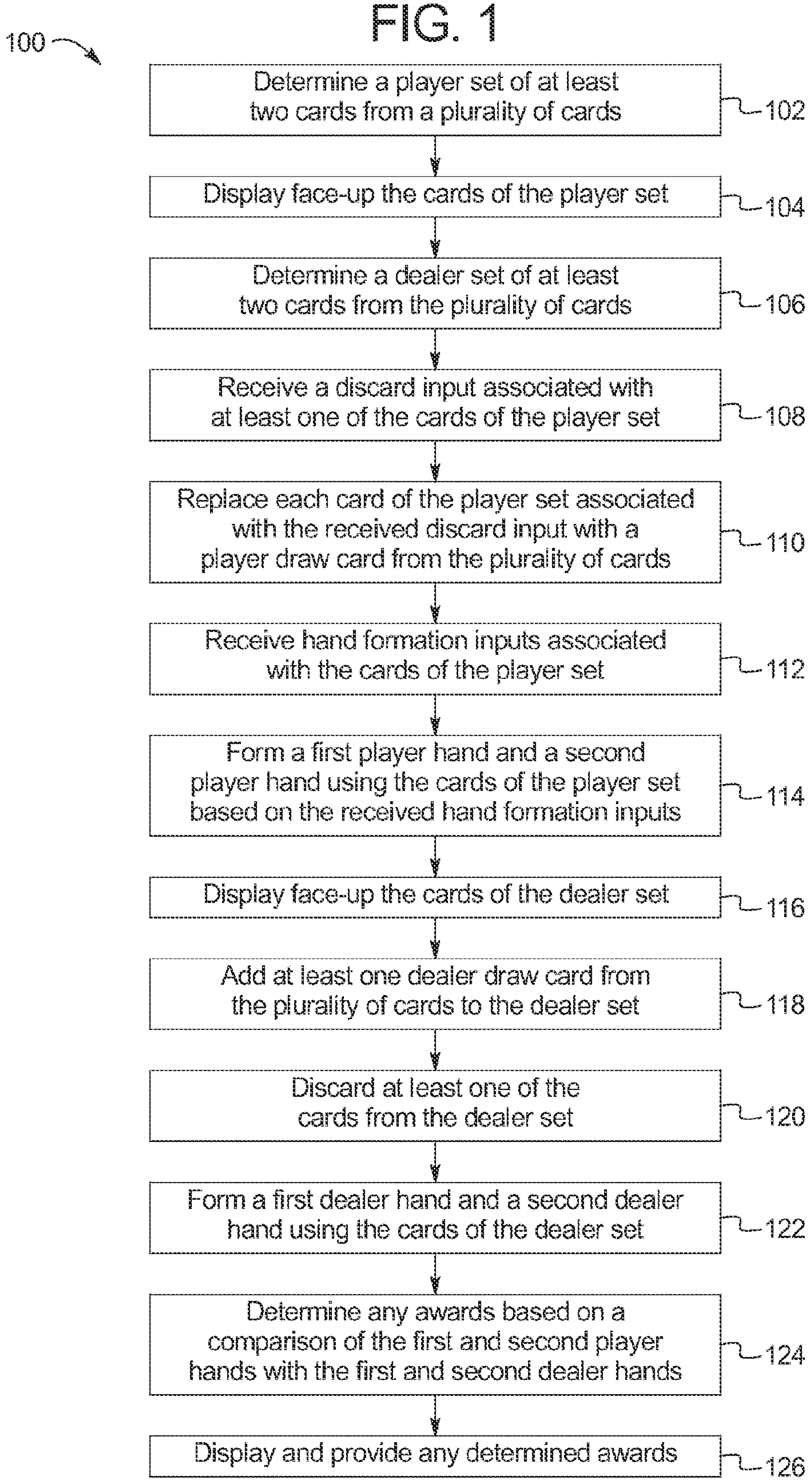
FIG. 1 is a flowchart illustrating a method of operating an example embodiment of the gaming system of the present disclosure configured to operate a single player card game.

FIG. 1 illustrates a flowchart of an example process or method 100 of operating the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks may be changed, certain of the illustrated blocks may be optional, and/or certain of the illustrated blocks may not be employed.

In this example, the gaming system is configured to operate a card game associated with a plurality of cards. For a play of the card game for a player, the gaming system determines a player set of at least two cards from the plurality of cards, as indicated by block 102. The gaming system displays face-up the cards of the player set, as indicated by block 104. The gaming system determines a dealer set of at least two cards from the plurality of cards, as indicated by block 106. The gaming system enables the player to discard at least one of the cards of the player set and, accordingly, receives a discard input associated with at least one of the cards of the player set, as indicated by block 108.

The gaming system replaces each card of the player set associated with the received discard input with a player draw card from the plurality of cards, as indicated by block 110. In other words, for each card of the player set associated with the received discard input, the gaming system removes that card from the player set, determines a player draw card from the plurality of cards, and adds the player draw card to the player set. The gaming system enables the player to form a first player hand and a second player hand using the cards of the player set and, accordingly, receives hand formation inputs associated with the cards of the player set, as indicated by block 112. The gaming system forms the first player hand and the second player hand using the cards of the player set based on the received hand formation inputs, as indicated by block 114.

The gaming system displays face-up the cards of the dealer set, as indicated by block 116. The gaming system adds at least one dealer draw card from the plurality of cards to the dealer set, as indicated by block 118. Put differently, the gaming system determines at least one dealer draw card from the plurality of cards and adds the at least one dealer draw card to the dealer set. The gaming system discards at least one of the cards of the dealer set based on one or more rules or conditions, as indicated by block 120. In one example, the gaming system determines all possible combinations of two-card and five-card hands formed from the cards of the dealer set, and determines which cards to discard based on which of the combinations of two-card and five-card hands first maximizes the value of the two-card hand and then maximizes the value of the five-card hand (i.e., determines to discard whichever cards of the dealer set that are not included in that two-card hand or that five-card hand). In another example, the gaming system discards the least valuable card(s) or the card (s) least likely to be included in the two dealer hands. The gaming system forms a first dealer hand and a second dealer hand using the cards of the dealer set based on one or more rules or conditions (such as a set of "House Rules"), as indicated by block 122. The gaming system determines any awards based on a comparison of the first and second player hands with the first and second dealer hands, respectively, as indicated by block 124, and displays and provides any determined awards, as indicated by block 126. In this example, a commission, vigorish, or "vig" is not deducted from any determined awards before those awards are provided to the player, though in other embodiments such a commission, vigorish, or "vig" is deducted from any determined awards before those awards are provided to the player.

FIGS. 2A, 2B, 2C, 20, 2E, 2F, 2G, 2H, and 2I illustrate screen shots of the gaming system of the present disclosure operating one example of the card game in which the card game is a Pai Gow draw poker game. In this example, the Pai Gow draw poker game is associated with a plurality of cards including a standard fifty-two card deck of playing cards. It should be appreciated that the plurality of cards may include any suitable cards, such as multiple decks of cards or standard decks of cards including Jokers. The gaming system displays, such as on a display device 1116 or 1118 (as described below), a dealer display area 220 and a player display area 240. Dealer display area 220 includes a dealer set display area 222, a five-card dealer hand display area 224, and a two-card dealer hand display area 226. Similarly, player display area 240 includes a player set display area 242, a five-card player hand display area 244, and a two-card player hand display area 246.

The gaming system also displays a plurality of displays or meters, including: a credit meter 272 that displays the player's credit balance; a wager display 274 that displays any wagers placed on a play of the Pai Gow draw poker game; an award display 276 that displays any awards won for a play of the Pai Gow draw poker game; and a message box 260 that displays messages or indications before, during, or after play of the Pai Gow draw poker game. While in this illustrated example the gaming system indicates the player's credit balance, the player's wager, and any awards provided to the player in the form of amounts of credits, it should be appreciated that such indications may alternatively or additionally be made in the form of amounts of currency.

Figure 2A:
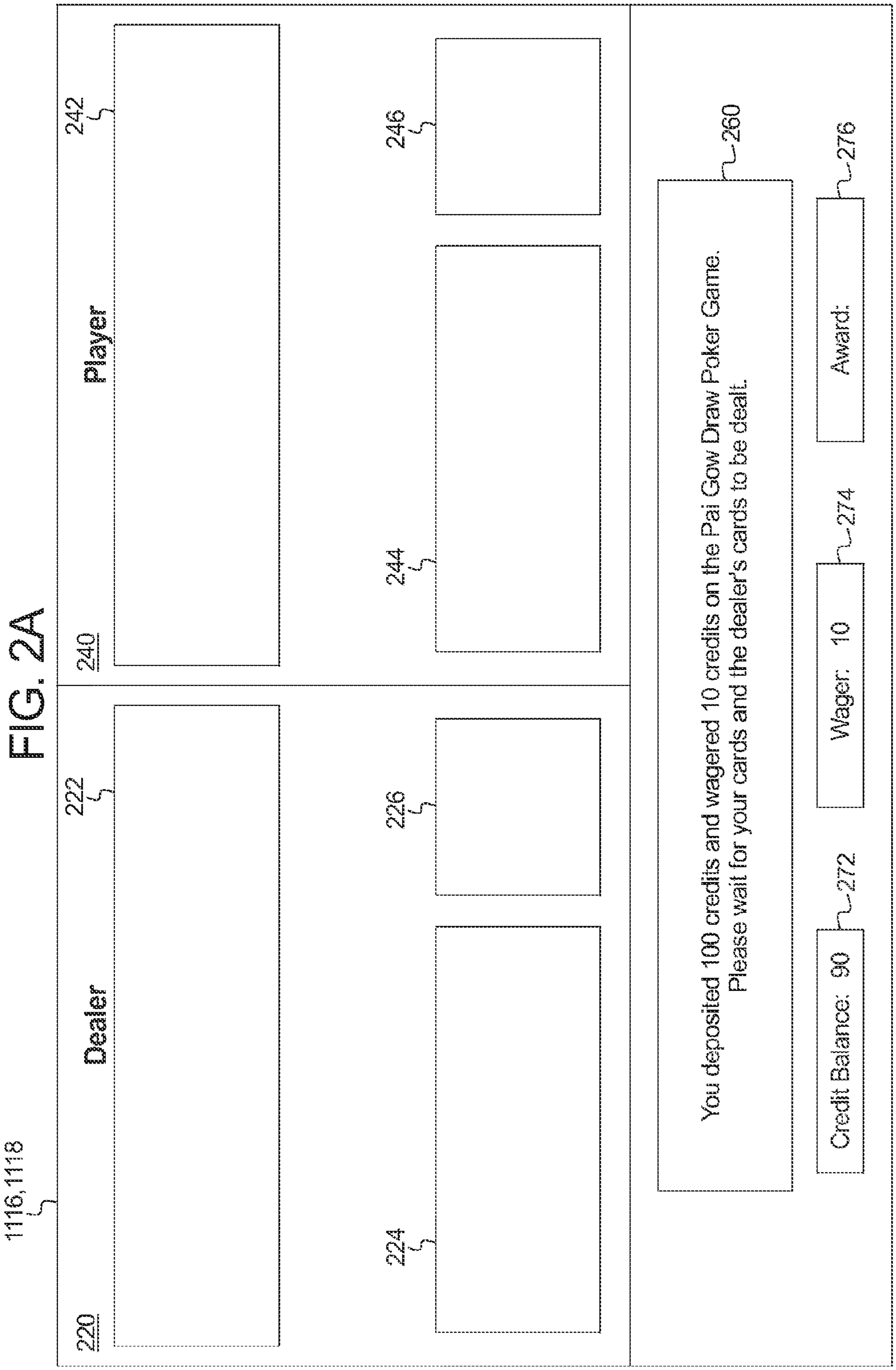
FIGS. 2A, 2B, 2C, 2D, 2E, 2F, 2G, 2H, and 2I illustrate screen shots of the gaming system of the present disclosure operating an example single player card game of the present disclosure.

As illustrated in FIG. 2A, the gaming system receives value, such as currency (or its equivalent), from a player. In this example, the gaming system provides the player a credit value of 100 credits, which represents the received value. The player subsequently places a wager of 10 credits for a play of the Pai Gow draw poker game. The gaming system displays the player's wager of 10 credits in wager display 274. The gaming system displays the player's total remaining credit balance of 90 credits (i.e., the player's initial credit balance of 100 credits minus the player's wager of 10 credits) in credit meter 272. The gaming system displays the following message in message box 260: "YOU DEPOSITED 100 CREDITS AND WAGERED 10 CREDITS ON THE PAI GOW DRAW POKER GAME. PLEASE WAIT FOR YOUR CARDS AND THE DEALER'S CARDS TO BE DEALT."

Figure 2B:
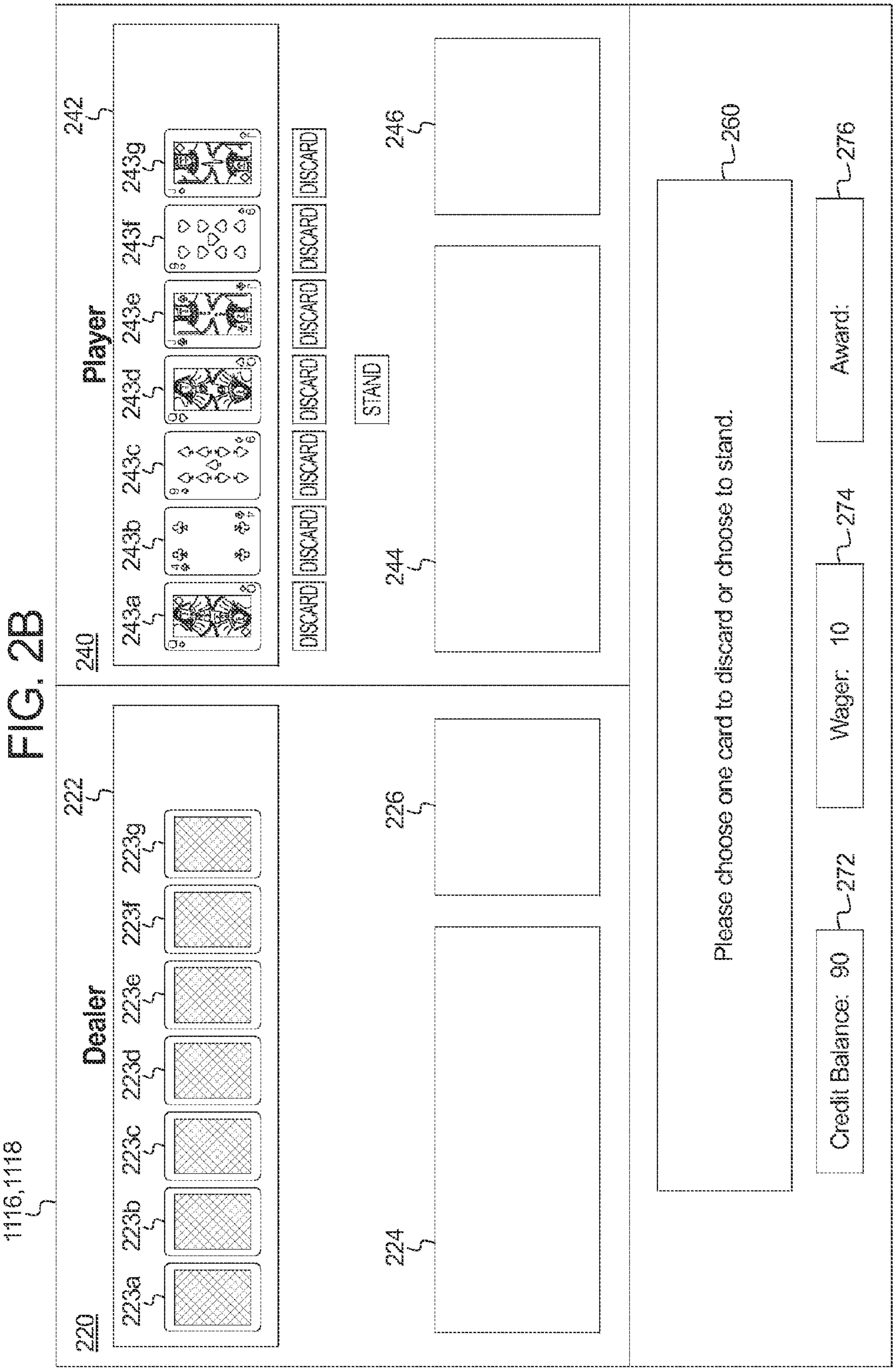
Figure 2C:
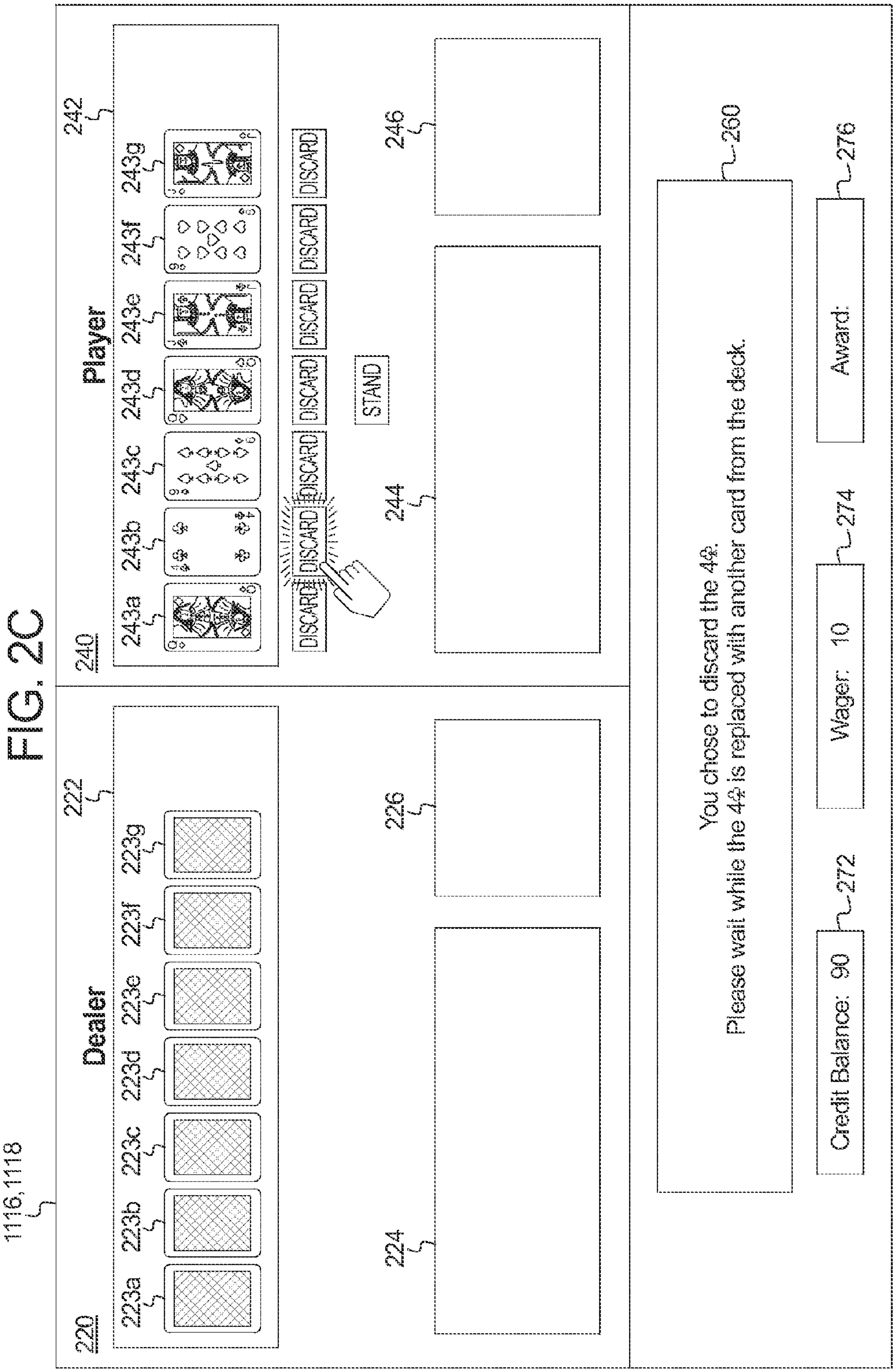

As illustrated in FIG. 2B, the gaming system determines a player set of seven cards 243*a*, 243*b*, 243*c*, 243*d*, 243*e*, 243*f*, and 243*g* from the plurality of cards, which the gaming system displays face-up in player set display area 242. Card 243*a* is the Q♦, card 243*b* is the 4♣, card 243*c* is the 9♠, card 243*d* is the Q♥, card 243*e* is the J♣, card 243*f* is the 9♥, and card 243*g* is the J♦. The gaming system determines a dealer set of seven cards 223*a*, 223*b*, 223*c*, 223*d*, 223*e*, 223*f*, and 223*g* from the plurality of cards, which the gaming system displays face-down in dealer set display area 222. In this example, the gaming system enables the player to choose one of the cards of the player set to discard or, alternatively, to choose not to discard any of the cards of the player set. The gaming system displays the following message in message box 260: "PLEASE CHOOSE ONE CARD TO DISCARD OR CHOOSE TO STAND."

As illustrated in FIG. 20, the gaming system receives a discard input from the player associated with card 243*b* (4♣) of the player set. The gaming system displays the following message in message box 260: "YOU CHOSE TO DISCARD THE 4♣. PLEASE WAIT WHILE THE 4♣ IS REPLACED WITH ANOTHER CARD FROM THE DECK."

Figure 2D:
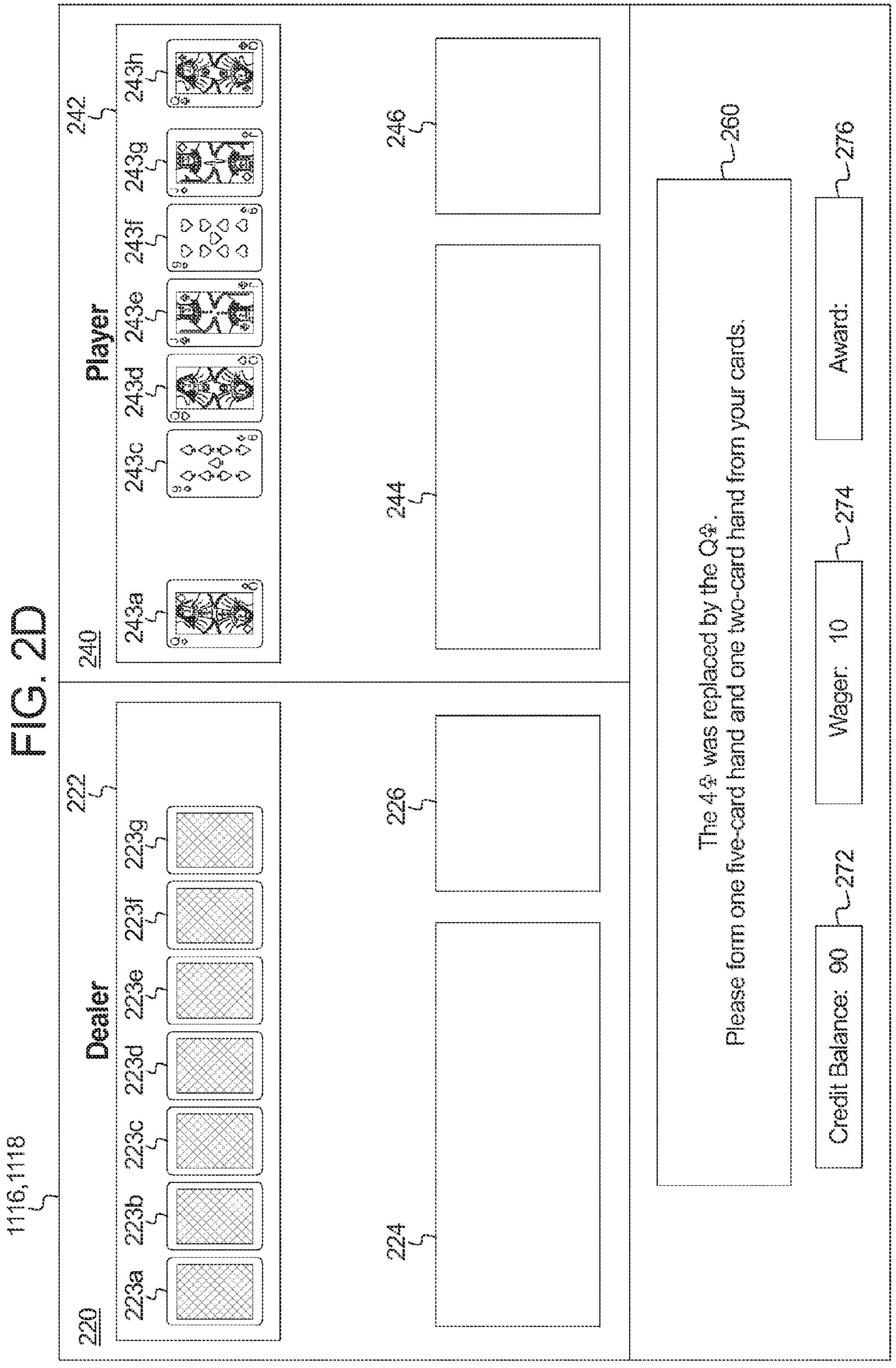

As illustrated in FIG. 2D, based on the received discard input, the gaming system removes card 243*b* from the player set; selects a player draw card 243*h*, which is the Q♣, from the plurality of cards; and adds player draw card 243*h* to the player set. That is, the gaming system replaces discarded card 243*b* with player draw card 243*h*. At this point, the gaming system enables the player to form a five-card hand and a two-card hand according to a set of Pai-Gow Poker hand setting rules. The gaming system displays the following message in message box 260: "THE 4♣ WAS REPLACED BY THE Q♣. PLEASE FORM ONE FIVE-CARD HAND AND ONE TWO-CARD HAND FROM YOUR CARDS."

Figure 2E:
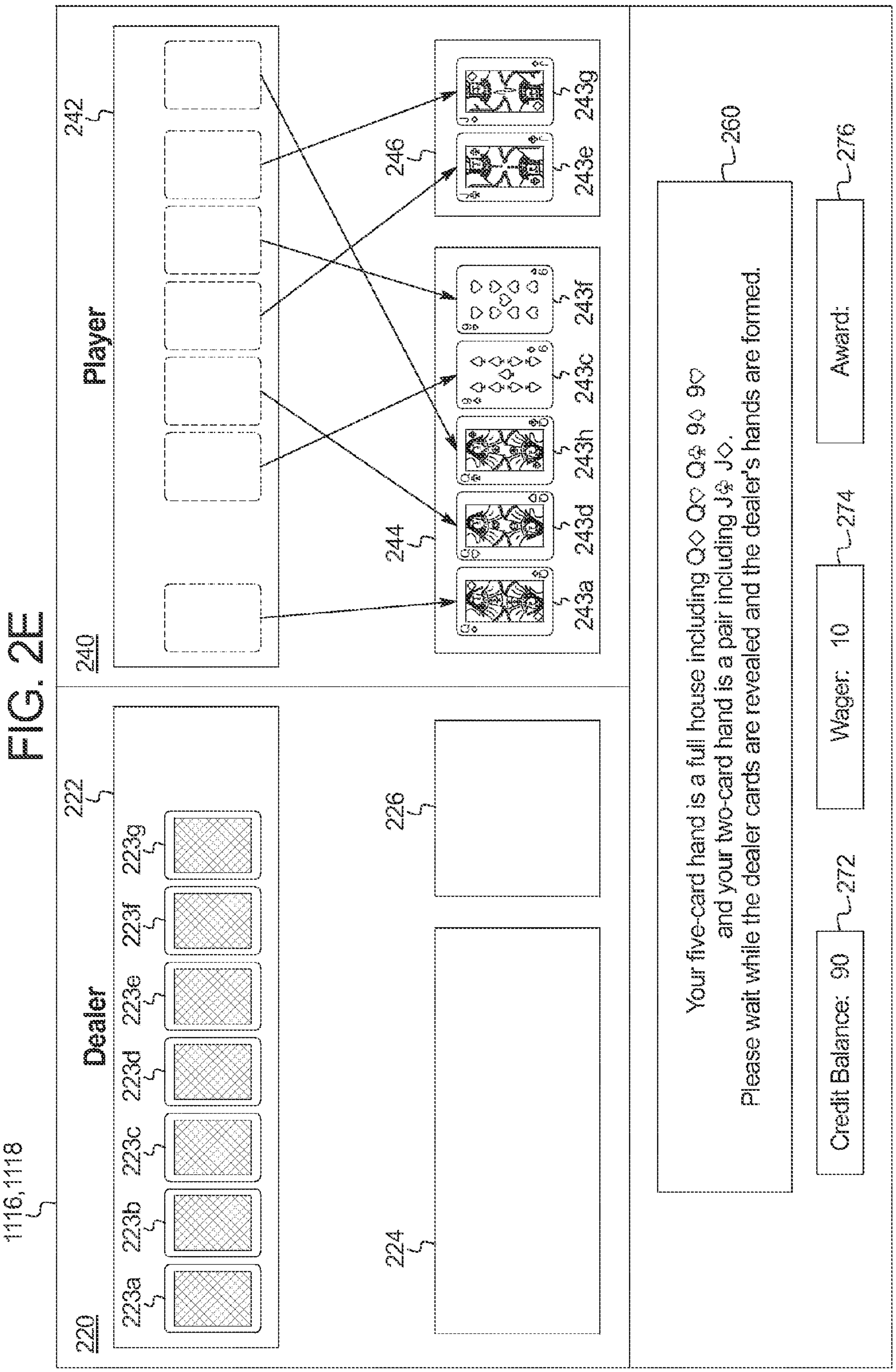

As illustrated in FIG. 2E, the gaming system receives hand formation inputs associated with the cards of the player set and forms the player's five-card and two-card hands using the cards of the player set based on the received hand formation inputs. More specifically, in this example, the gaming system forms the player's five-card hand from cards 243*a*, 243*d*, 243*h*, 243*c*, and 243*f*, and forms the player's two-card hand from cards 243*e* and 243*g*. The gaming system displays the player's five-card hand of Q♦ Q♥ Q♣ 9♠ 9♥, in five-card player hand display area 244, and displays the player's two-card hand of J♣ J♦ in two-card player hand display area 246. The gaming system displays the following message in message box 260: "YOUR FIVE-CARD HAND IS A FULL HOUSE INCLUDING Q♦ Q♥ Q♣ 9♠ 9♥ AND YOUR TWO-CARD HAND IS A PAIR INCLUDING J♣ J♦. PLEASE WAIT WHILE THE DEALER'S CARDS ARE REVEALED AND THE DEALER'S HANDS ARE FORMED."

In certain embodiments, the hand formation inputs include the selection and de-selection of cards to be formed into the player's two-card hand (and/or five-card hand) and, once such cards are selected, the gaming system enables the player to provide a confirmation input. Upon receiving the confirmation input (i.e., upon receiving the player's confirmation that the player's two-card hand (and/or five-card hand) should include the selected cards), the gaming system determines whether the player's two-card hand (and/or five-card hand) conforms to one or more hand formation rules. If the gaming system determines that the player's two-card hand (and/or five-card hand) conforms to the hand formation rules, play proceeds. If not, the gaming system displays a message that the player's two-card hand (and/or five-card hand) is improper, and enables the player to re-form the player's two-card hand (and/or five-card hand).

Figure 2F:
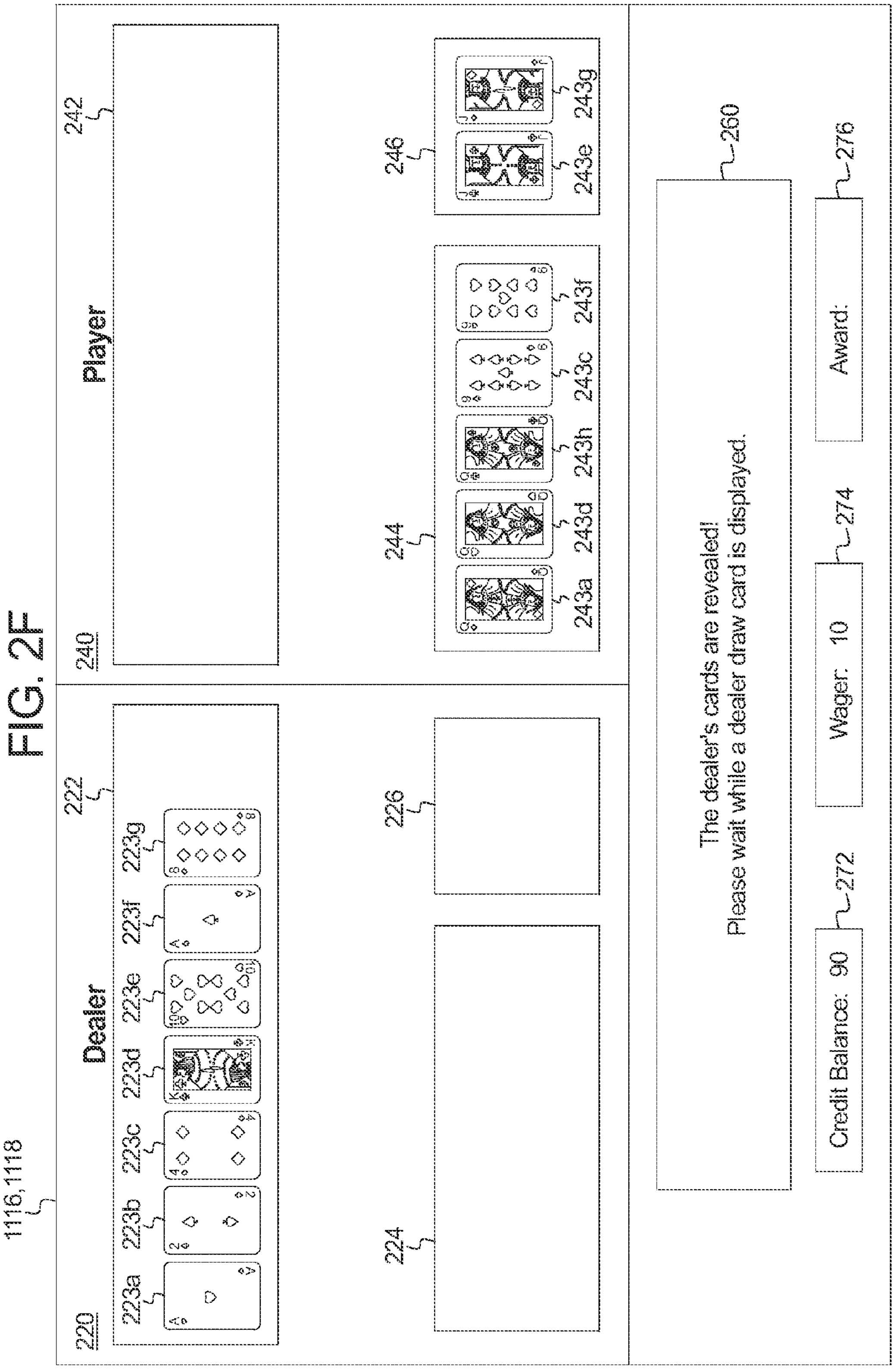

As illustrated in FIG. 2F, the gaming system reveals the cards of the dealer set. In this example, card 223*a* is the A♥, card 223*b* is the 2♠, card 223*c* is the 4♦, card 223*d* is the K♣, card 223*e* is the 10♥, card 223*f* is the A♠, and card 223*g* is the 8♦. The gaming system displays the following message in message box 260: "THE DEALER'S CARDS ARE REVEALED! PLEASE WAIT WHILE A DEALER DRAW CARD IS DISPLAYED."

Figure 2G:
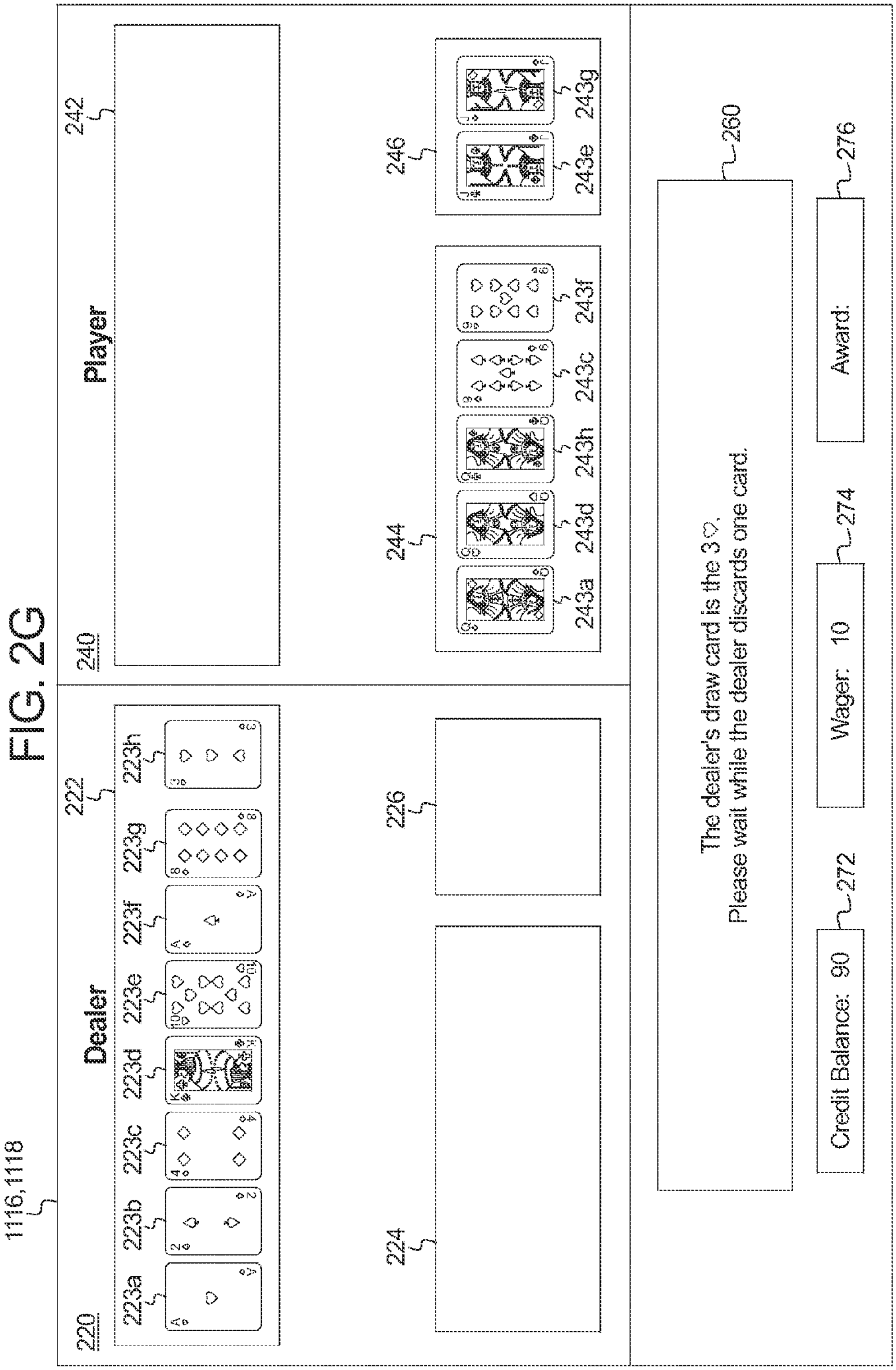

As illustrated in FIG. 2G, the gaming system selects a dealer draw card 223*h*, which is the 3♥, from the plurality of cards, and adds dealer draw card 223*h* to the dealer set. The gaming system then discards one of the cards of the dealer set based on one or more predetermined rules or conditions. In this example, the gaming system evaluates the eight cards, determines which of the eight cards will not be included in the two dealer hands, and discards that card from the dealer set. The gaming system displays the following message in message box 260: "THE DEALER'S DRAW CARD IS THE 3♥. PLEASE WAIT WHILE THE DEALER DISCARDS ONE CARD."

Figure 2H:
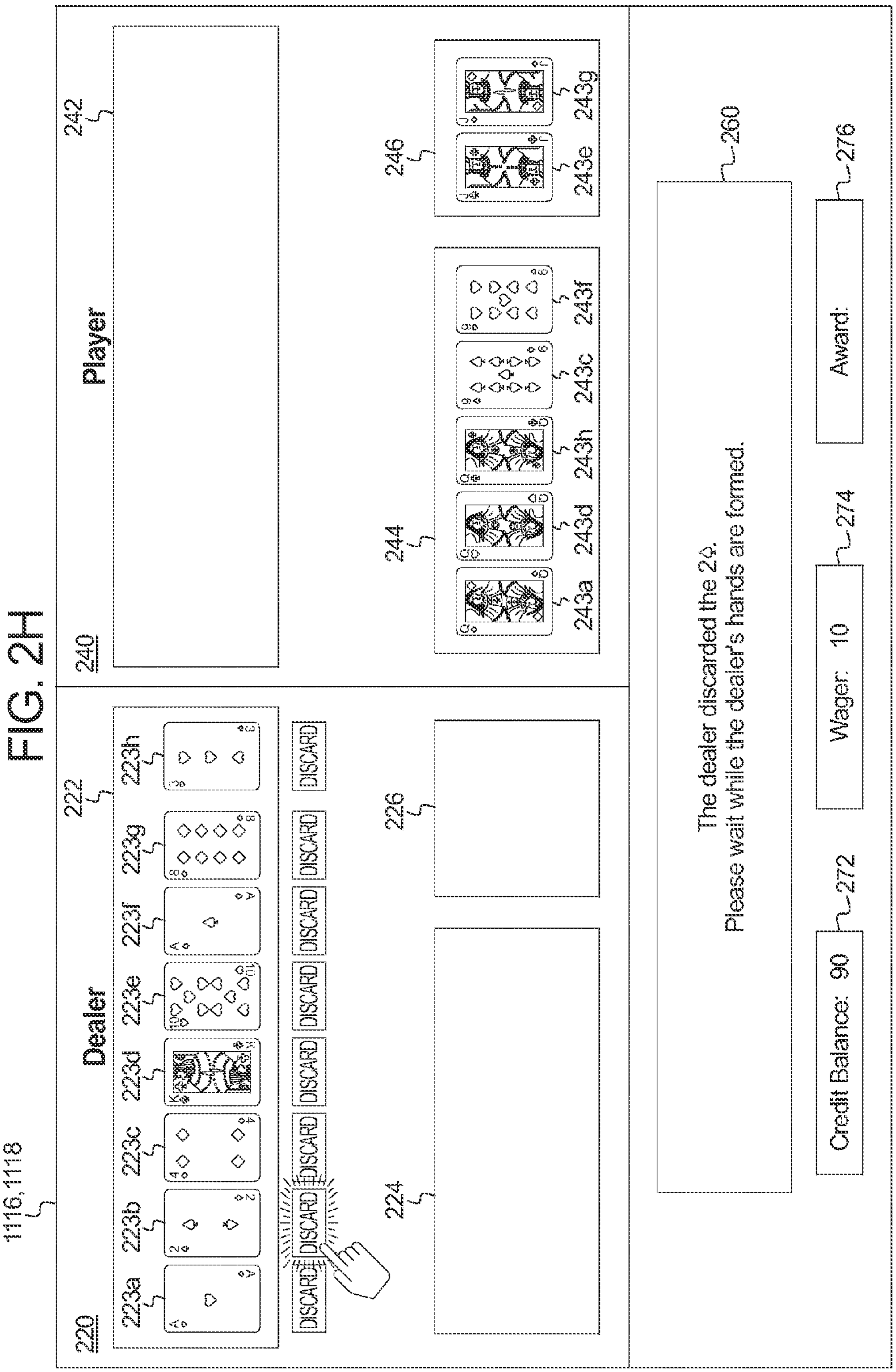

As illustrated in FIG. 2H, the gaming system discards card 223*b*, which is the 2♠, and removes card 223*b* from the dealer set. The gaming system then forms a five-card hand and a two-card hand according to the applicable set of "House Way" rules. The gaming system displays the following message in message box 260: "THE DEALER DISCARDED THE 2♠. PLEASE WAIT WHILE THE DEALER'S HANDS ARE FORMED."

Figure 2I:
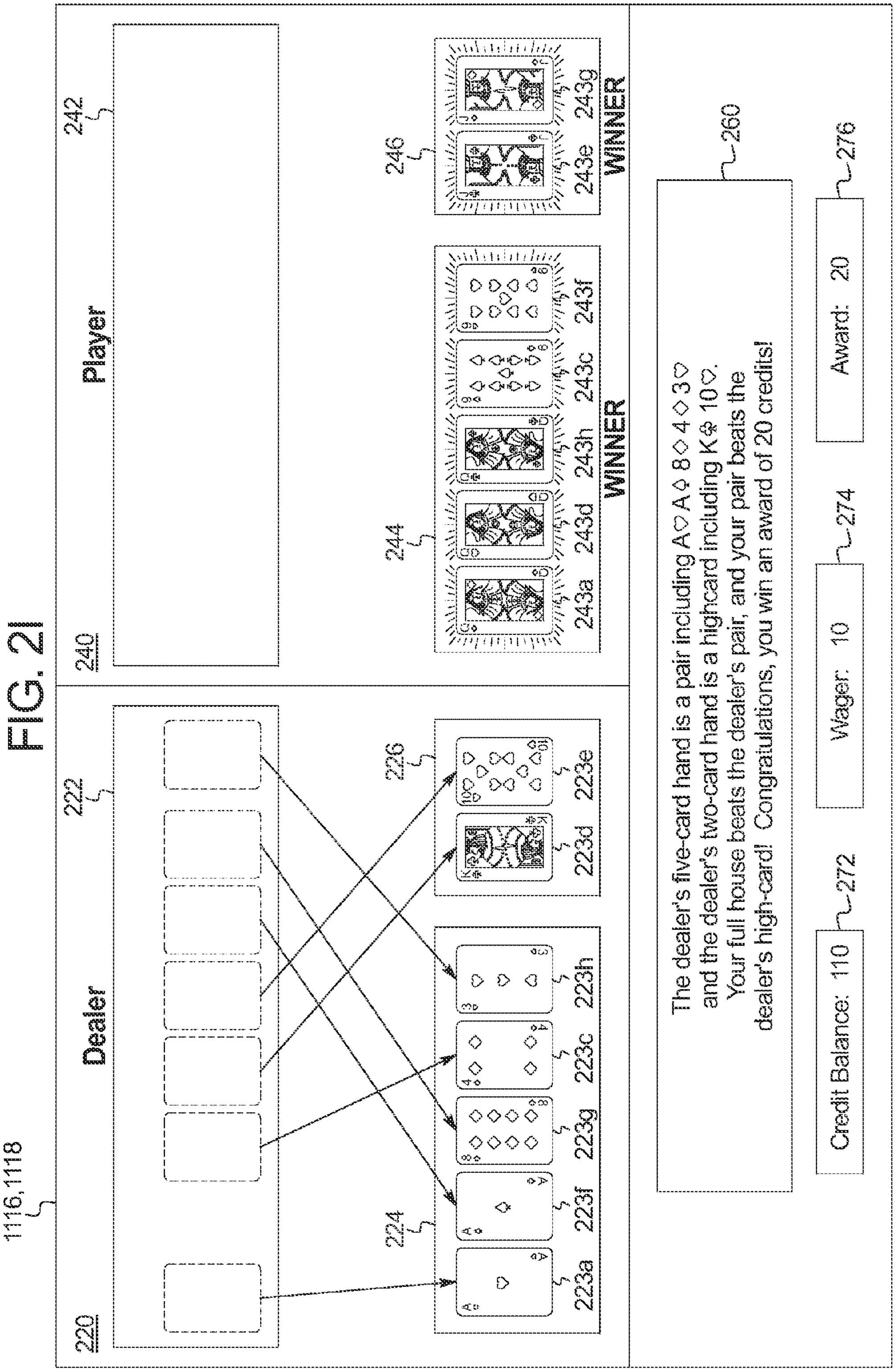

As illustrated in FIG. 2I, the gaming system employs the "House Way" rules to form the dealer's five-card hand from cards 223*a*, 223*f*, 223*g*, 223*c*, and 223*h* and the dealer's two-card hand from cards 223*d* and 223*e*. The gaming system displays the dealer's five-card hand of A♥ A♠ 8♦ 4♦ 3♥ in five-card dealer hand display area 224 and displays the dealer's two-card hand of K♣ 10♥ in two-card dealer hand display area 246. The gaming system determines that the player's five-card hand has a higher rank than a rank of the dealer's five-card hand (i.e., a full house ranks higher than a pair of Aces) and, therefore, that the player's five-card hand beats the dealer's five-card hand. The gaming system also determines that the player's two-card hand has a higher rank than a rank of the dealer's two-card hand (i.e., a pair of Jacks ranks higher than a King-high) and, therefore, that the player's two-card hand beats the dealer's two-card hand.

Since each player hand beat its respective dealer hand, the gaming system determines an award of 20 credits (i.e., pays out 1:1 based on the player's wager). The gaming system displays the 20 credit award in award meter 276, and updates the player's credit balance to reflect the 20 credit award (i.e., updates the player's credit balance from 90 credits to 110 credits to reflect the 20 credit award). The gaming system displays the following message in message box 260: "THE DEALER'S FIVE-CARD HAND IS A PAIR INCLUDING A♥ A♠ 8♦ 4♦ 3♥, AND THE DEALER'S TWO-CARD HAND IS A HIGH-CARD INCLUDING K♣ 10♥. YOUR FULL HOUSE BEAT'S THE DEALER'S PAIR, AND YOUR PAIR BEATS THE DEALER'S HIGH-CARD! CONGRATULATIONS, YOU WIN AN AWARD OF 20 CREDITS!"

It should be appreciated that the example embodiments described above with respect to FIGS. 1, 2A, 2B, 2C, 2D, 2E, 2F, 2G, 2H, and 2I may be adapted for multiplayer embodiments. That is, the steps described above may be performed for each of a plurality of players playing against a single dealer.

In the example embodiments described above with respect to FIGS. 1, 2A, 2B, 2C, 2D, 2E, 2F, 2G, 2H, and 2I, the gaming system requires the player to choose which cards (if any) to discard before displaying the player draw card(s). In other words, in these example embodiments, the gaming system enables the player to discard at least one of the cards in the player set initially dealt to the player, and does not enable the player to discard any player draw cards that are subsequently added to the player set. In other embodiments, however, the gaming system enables the player to choose which cards (if any) to discard after displaying at least one player draw card. Thus, in such embodiments, the gaming system provides the player the option of discarding at least one player draw card in addition to or instead of discarding at least one of the cards of the player set initially dealt to the player.

Additionally, in the example embodiments described above with respect to FIGS. 1, 2A, 2B, 2C, 2D, 2E, 2F, 2G, 2H, and 2I, the gaming system adds the at least one dealer draw card to the dealer set and then determines which of the cards of the dealer set (including the at least one dealer draw card) to discard. In other words, in these example embodiments, the gaming system has the option of discarding the dealer draw card in addition to or instead of discarding at least one of the cards of the dealer set initially dealt to the dealer. In other embodiments, however, the gaming system chooses which cards of the dealer set to discard before any dealer draw cards are added to the dealer set. Thus, in these embodiments, the gaming system may discard at least one of the cards of the dealer set initially dealt to the dealer, and may not discard any dealer draw cards that are subsequently added to the dealer set. In certain embodiments, the gaming system employs knowledge of which cards have already been removed from the deck (such as which cards were initially included in the player set, discarded from the player set, and added to the player set) when determining which cards to discard from the dealer set.

In certain embodiments, the gaming system displays all of the cards of the player set face-up before enabling the player to choose which card(s) (if any) to discard from the player set. In other embodiments, the gaming system displays fewer than all of the cards of the player set face-up before enabling the player to choose which card(s) (if any) to discard from the player set. For instance, in one example the gaming system displays one of the seven cards of the player set face-up, and enables the player to choose whether to discard that one card. If not, the gaming system does not provide the player another opportunity to discard any of the other cards of the player set. In another example, the gaming system displays four of the seven cards of the player set face-up, and enables the player to choose whether to discard one of those four cards. If not, the gaming system does not provide the player another opportunity to discard any of the other cards of the player set.

In certain embodiments, the gaming system enables the player and the dealer to each discard up to a same quantity of cards from their respective sets of cards. For instance, in one example, the gaming system enables both the player and the dealer to discard up to two cards from their respective sets of cards. In another embodiment, the gaming system enables the player and the dealer to each discard up to different quantities of cards from their respective sets of cards. For instance, in one example, the gaming system enables the player to discard up to two cards from the player set and enables the dealer to discard up to three cards from the dealer set. In a further embodiment, the gaming system enables the dealer to discard up to the quantity of cards discarded by the player from the player set. For instance, in one example, if the player discards one card from the player set, the gaming system enables the dealer to discard up to one card (i.e., zero cards or one card) from the dealer set.

In one embodiment, the gaming system requires a side wager to be placed or a fee to be paid in addition to any placed wagers to enable the discard/draw feature. That is, in this embodiment, if the gaming system does not receive the side wager or the fee, the gaming system does not enable the player to discard any cards of the player set or draw any player draw cards. In certain embodiments, the gaming system requires the player to place the side wager or to pay the fee before the initial player set and/or the initial dealer set is dealt, while in other embodiments the gaming system enables the player to place the side wager or pay the fee after the initial player set and/or the initial dealer set is dealt.

As described above, under certain house rules (such as Pai Gow Poker house rules), if the player wins a play of the card game, the house withholds a defined percentage of the player's award (known as a commission, a vigorish, or a "vig"). In certain embodiments, the present disclosure contemplates not withholding a commission from the player if the player wins a play of the card game. That is, in certain embodiments, the dealer (i.e., the "house") benefits from the draw and discard features more than the player and, therefore, there is a sufficient "house" edge to remove the need for the commission that the "house" would otherwise withhold for each player win.

While the card game is a Pai Gow draw poker game in the example embodiments described above with respect to FIGS. 1, 2A, 2B, 2C, 2D, 2E, 2F, 2G, 2H, and 2I, it should be appreciated that the card game may be any suitable card game in which a player and a dealer each form two or more hands from their respective sets of cards, such as San Lo Poker, Three Card Double Happiness, and Three-Hand Asia Poker.

In one example embodiment in which the card game is San Lo Poker, the gaming system determines and displays face-up a six card player set and determines and displays face-down a six card dealer set from a plurality of cards. The gaming system enables the player to discard one of the cards of the player set and receives a discard input associated with one of the cards of the player set. The gaming system removes the card associated with the discard input from the player set, determines a player draw card from the plurality of cards, and adds the player draw card to the player set. The gaming system enables the player to form a three-card hand, a two-card hand, and a one-card hand from the cards of the player set; receives hand formation inputs associated with the cards of the player set; and forms the player's three-card hand, two-card hand, and one-card hand based on the received hand formation inputs using the cards of the player set.

The gaming system reveals the cards of the dealer set, selects a dealer draw card from the plurality of cards, and adds the dealer draw card to the dealer set. The gaming system discards one of the cards of the dealer set based on one or more rules or conditions. The gaming system employs a set of "House Way" rules to form a three-card hand, a two-card hand, and a one-card hand using the cards of the dealer set. The gaming system determines any awards by comparing the player's three-card, two-card, and one-card hands to the dealer's three-card, two-card, and one-card hands, and displays and provides any determined awards.

In certain embodiments, rather than providing the player and the dealer with separate player draw cards and dealer draw cards to replace their respective discarded cards (if any), the gaming system provides one or more community cards that the player and the dealer may each use to replace their discarded cards (if any). In one example, the gaming system enables both the player and the dealer to each discard up to two cards from their respective sets of cards, and removes any discarded cards from the sets. The gaming system determines and displays two community cards, and enables the player and the dealer to form their respective hands using: (a) the remaining cards of their respective sets set and one of the two community cards (if they discarded one card), (b) the remaining cards of their respective sets and both of the community cards (if they discarded two cards), or (c) the cards of their respective sets (if they did not discard any cards). In certain embodiments, the dealer and/or the player has knowledge of one or more of the community cards before determining which cards to discard, while in other embodiments the dealer and/or the player does not have knowledge of the community cards before determining which cards to discard.

It should be appreciated that the present disclosure contemplates adapting such embodiments to a multiplayer format. For instance, in one embodiment, the gaming system includes a plurality of EGMs, each of which is played by a player participating in the card game. Each of the players and the dealer may use the community cards to replace any discarded cards (if any).

In other multiplayer embodiments, rather than providing each player with separate player draw cards to replace their discarded card or cards (if any), the gaming system provides one or more community cards that each of the players may use to replace their discarded card or cards (if any). In these embodiments, however, the gaming system provides the dealer with dealer draw cards as described above with respect to FIGS. 1, 2A, 2B, 2C, 2D, 2E, 2F, 2G, 2H, and 2I. That is, in these embodiments, the dealer does not use the community cards to replace any discarded cards. In one example, the gaming system enables each of a plurality of players to discard up to two cards from that player's player set, and removes any discarded cards from the player sets. The gaming system determines and displays two community cards, and enables each player to form that player's first and second player hands using: (a) the remaining cards of that player's player set and one of the two community cards (if that player discarded one card), (b) the remaining cards of that player's player set and both of the community cards (if that player discarded two cards), or (c) the cards of that player's player set (if that player did not discard any cards).

Figure 3:
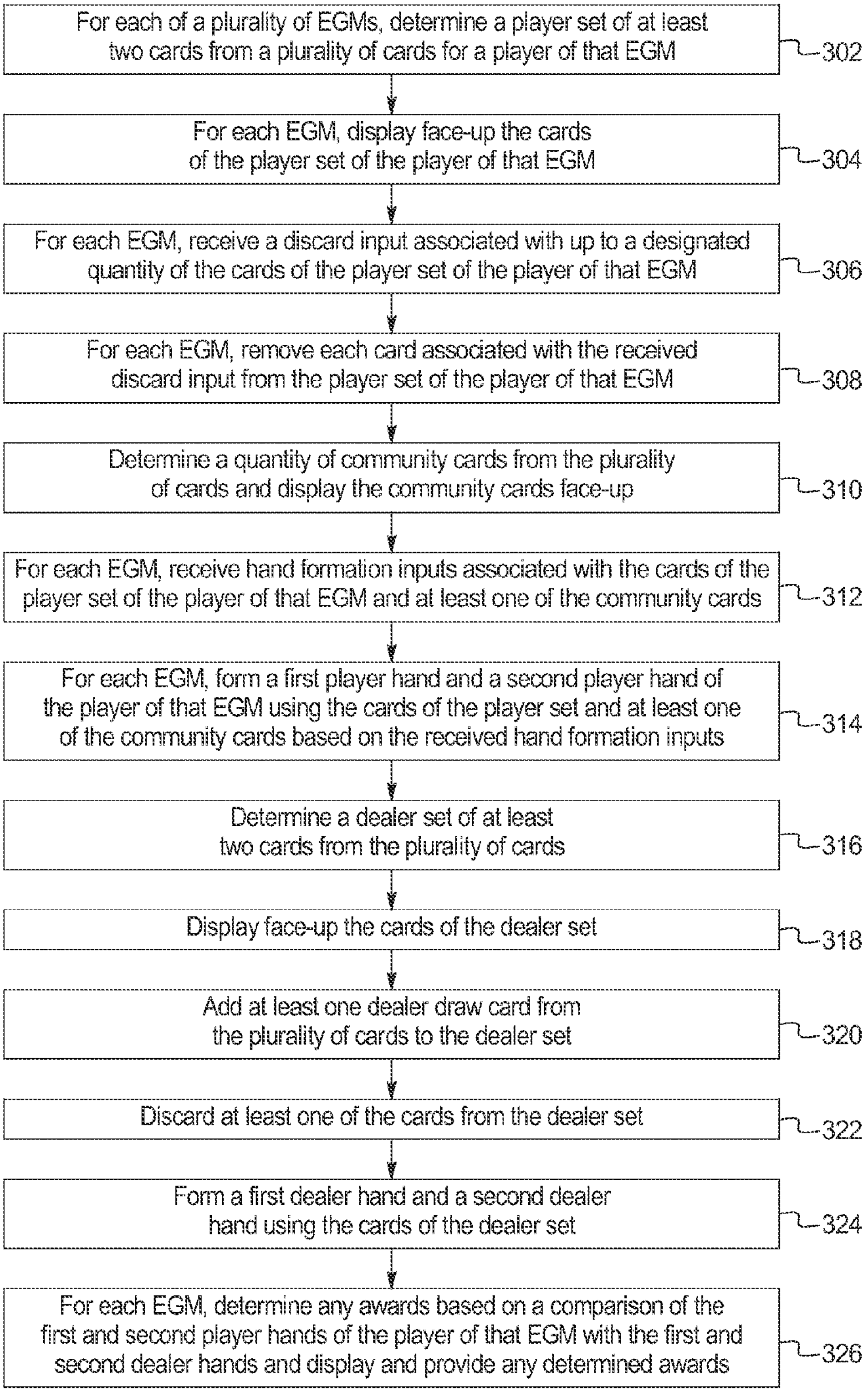
FIG. 3 is a is a flowchart illustrating a method of operating an example embodiment of the gaming system of the present disclosure configured to operate a multiplayer card game.

FIG. 3 illustrates a flowchart of an example process or method 300 of operating one such multiplayer embodiment of the gaming system of the present disclosure. In various embodiments, process 300 is represented by a set of instructions stored in one or more memories and executed by one or more processors. Although process 300 is described with reference to the flowchart shown in FIG. 3, it should be appreciated that many other processes of performing the acts associated with this illustrated process may be employed. For example, the order of certain of the illustrated blocks may be changed, certain of the illustrated blocks may be optional, and/or certain of the illustrated blocks may not be employed.

In this example, the gaming system is configured to operate a multiplayer card game associated with a plurality of cards. The gaming system includes a plurality of EGMs. For a play of the card game for each EGM, the gaming system determines a player set of at least two cards from a plurality of cards for a player of that EGM, as indicated by block 302. For each EGM, the gaming system displays face-up the cards of the player set of the player of that EGM, as indicated by block 304. For each EGM, the gaming system enables the player of that EGM to discard up to a designated quantity of the cards of the player set of that player and, accordingly, receives a discard input associated with up to the designated quantity of the cards of the player set, as indicated by block 306.

For each EGM, the gaming system removes each card associated with the received discard input from the player set of the player of that EGM, as indicated by block 308. The gaming system determines and displays face-up a quantity of community cards from the plurality of cards, as indicated by block 310. For each EGM, the gaming system enables the player of that EGM to form a first player hand and a second player hand using the cards of the player set and at least one of the community cards and, accordingly, receives hand formation inputs associated with the cards of the player set and at least one of the community cards, as indicated by block 312. For each EGM, the gaming system forms the first player hand and the second player hand for the player of that EGM using the cards of the player set and at least one of the community cards based on the received hand formation inputs, as indicated by block 314.

The gaming system determines a dealer set of at least two cards from the plurality of cards, as indicated by block 316. The gaming system displays face-up the cards of the dealer set, as indicated by block 318. The gaming system adds at least one dealer draw card from the plurality of cards to the dealer set, as indicated by block 320. Put differently, the gaming system determines at least one dealer draw card from the deck and adds the at least one dealer draw card to the dealer set. The gaming system discards at least one of the cards of the dealer set based on one or more rules or conditions, as indicated by block 322. The gaming system forms a first dealer hand and a second dealer hand using the cards of the dealer set based on one or more rules or conditions (such as a set of "House Rules"), as indicated by block 324.

For each EGM, the gaming system determines any awards for the player of that EGM based on a comparison of the first and second player hands of the player of that EGM with the first and second dealer hands, respectively, and displays and provides any determined awards, as indicated by block 326.

FIGS. 4A, 4B, 4C, 4D, 4E, 4F, 4G, and 4H illustrate screen shots of the gaming system of the present disclosure operating one example of the card game in which the card game is a Pai Gow draw poker game. In this example, the Pai Gow draw poker game is associated with a plurality of cards including a standard fifty-two card deck of playing cards. The gaming system displays, such as on a display device 1116 or 1118 (as described below), a dealer display area 420, a first player display area 440, a second player display area 460, and a community display area 480. Dealer display area 420 includes a dealer set display area 422, a five-card dealer hand display area 424, and a two-card dealer hand display area 426. Similarly, first player display area 440 includes a first player set display area 442, a five-card first player hand display area 444, and a two-card first player hand display area 446. Second player display area 460 includes a second player set display area 462, a five-card second player hand display area 464, and a two-card second player hand display area 466. Community display area 480 includes a community card display area 482.

The gaming system also displays a plurality of displays or meters, including: credit meters 441 and 461 that display the respective players' credit balances; wager displays 443 and 463 that display any wagers placed by the respective players on a play of the Pai Gow draw poker game; award displays 445 and 465 that display any awards won by the respective players for a play of the Pai Gow draw poker game; and a message box 490 that displays messages or indications before, during, or after play of the Pai Gow draw poker game. While in this illustrated example the gaming system indicates the players' credit balances, the players' wagers, and any awards provided to the players in the form of amounts of credits, it should be appreciated that such indications may alternatively or additionally be made in the form of amounts of currency.

Figure 4A:
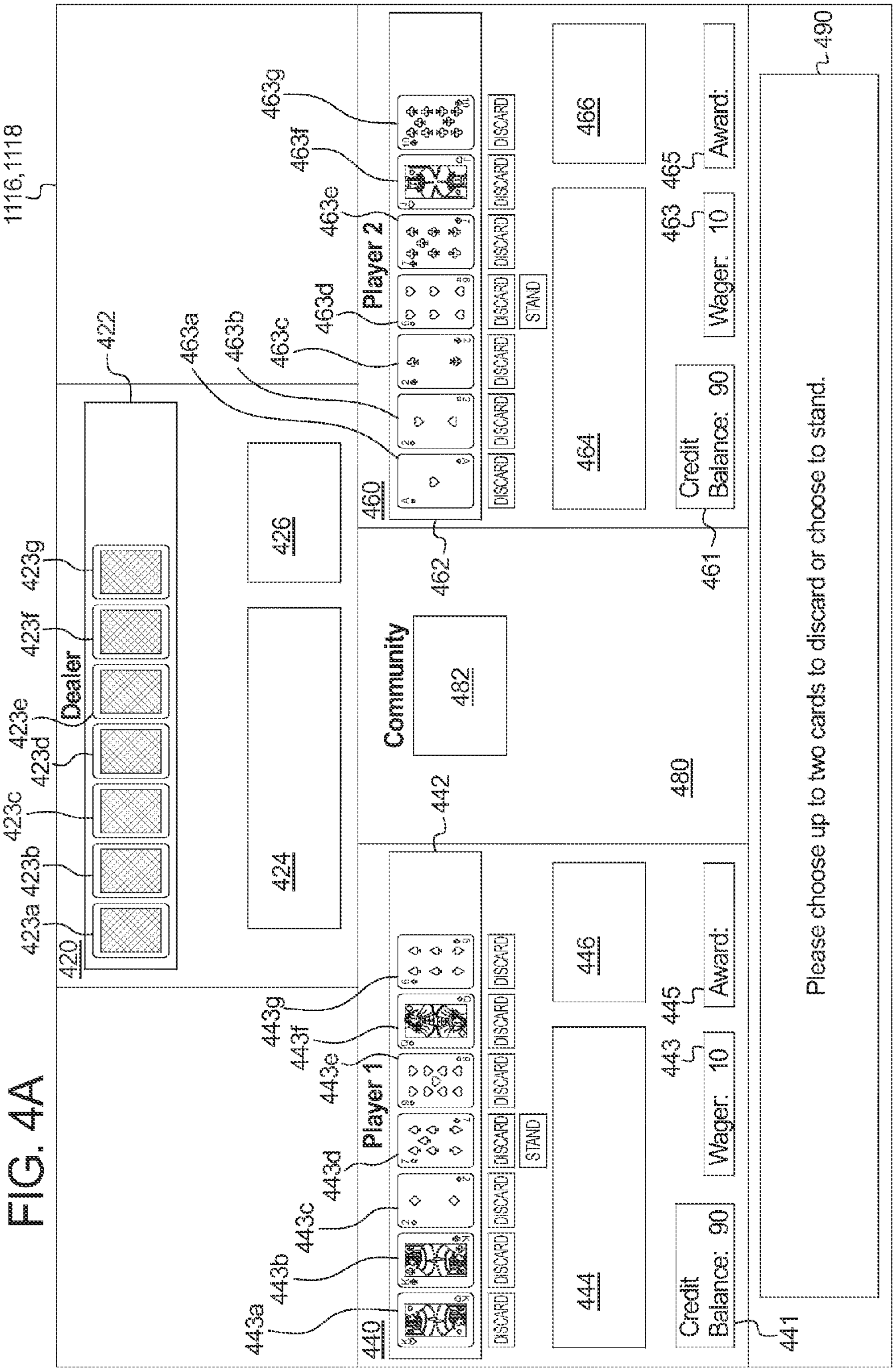
FIGS. 4A, 4B, 4C, 4D, 4E, 4F, 4G, and 4H illustrate screen shots of the gaming system of the present disclosure operating an example multiplayer card game of the present disclosure.

As illustrated in FIG. 4A, the gaming system determines a first player set of seven cards 443*a*, 443*b*, 443*c*, 443*d*, 443*e*, 443*f*, and 443*g* from the plurality of cards, which the gaming system displays face-up in first player set display area 442. Card 443*a* is the K♥, card 443*b* is the K♣, card 443*c* is the 2♦, card 443*d* is the 7♠, card 443*e* is the 9♥, card 443*f* is the Q♦, and card 443*g* is the 6♠. The gaming system determines a second player set of seven cards 463*a*, 463*b*, 463*c*, 463*d*, 463*e*, 463*f*, and 463*g* from the plurality of cards, which the gaming system displays face-up in second player set display area 462. Card 463*a* is the A♥, card 463*b* is the 2♥, card 463*c* is the 2♣, card 463*d* is the 6♥, card 463*e* is the 7♣, card 463*f* is the J♥, and card 463*g* is the 10♣. The gaming system determines a dealer set of seven cards 423*a*, 423*b*, 423*c*, 423*d*, 423*e*, 423*f*, and 423*g* from the plurality of cards, which the gaming system displays face-down in dealer set display area 422. In this example, the gaming system enables each player to choose up to two of the cards of that player's player set to discard. The gaming system displays the following message in message box 490: "PLEASE CHOOSE UP TO TWO CARDS TO DISCARD OR CHOOSE TO STAND."

Figure 4B:
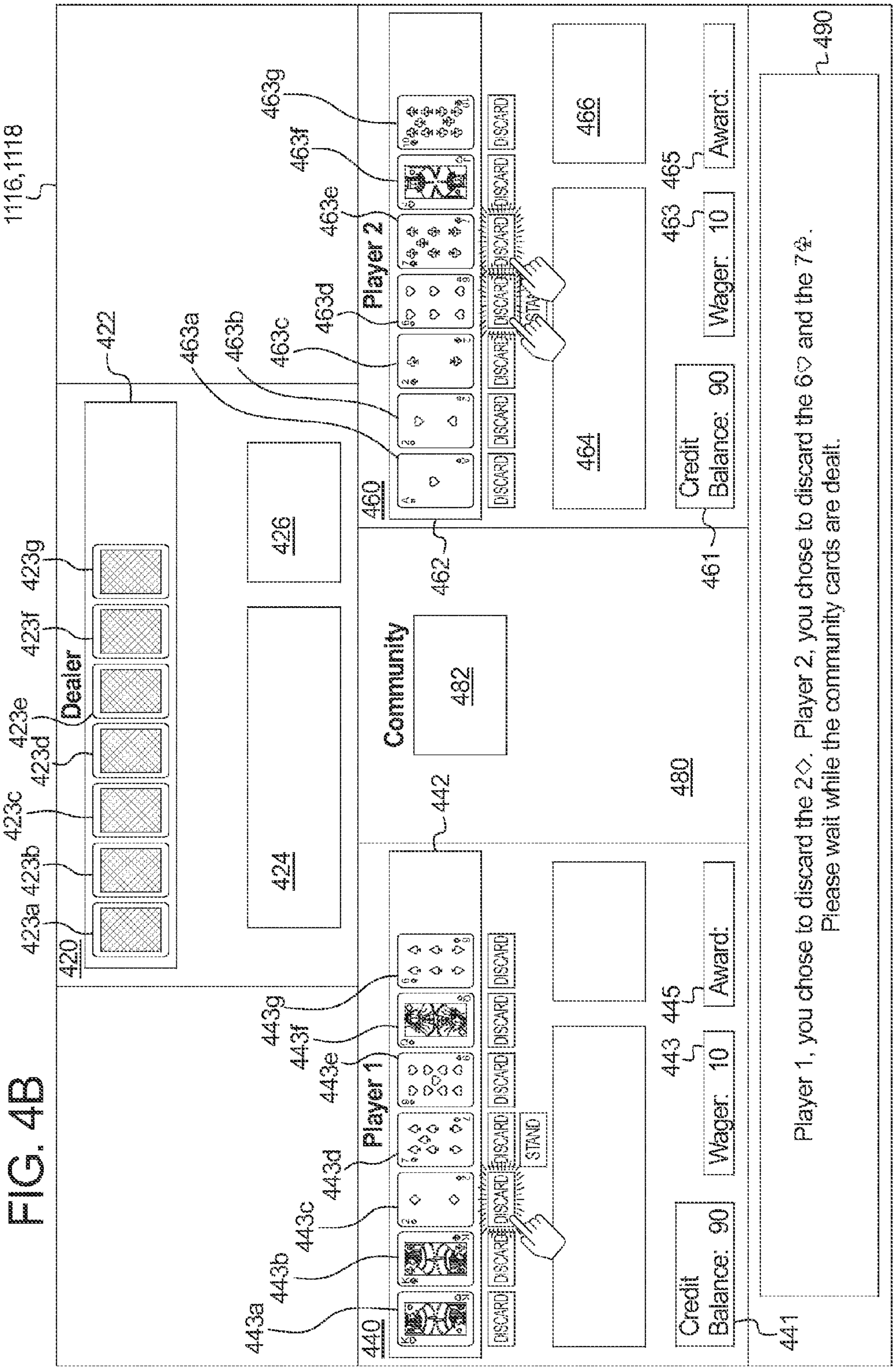

As illustrated in FIG. 4B, the gaming system receives a discard input from the first player associated with card 443*c* (2♦) of the first player set. The gaming system also receives a discard input from the second player associated with cards 463*d* (6♥) and 463*e* (7♣) of the second player set. The gaming system displays the following message in message box 490: "PLAYER 1, YOU CHOSE TO DISCARD THE 2♦. PLAYER 2, YOU CHOSE TO DISCARD THE 6♥ AND THE 7♣. PLEASE WAIT WHILE THE COMMUNITY CARDS ARE DEALT."

Figure 4C:
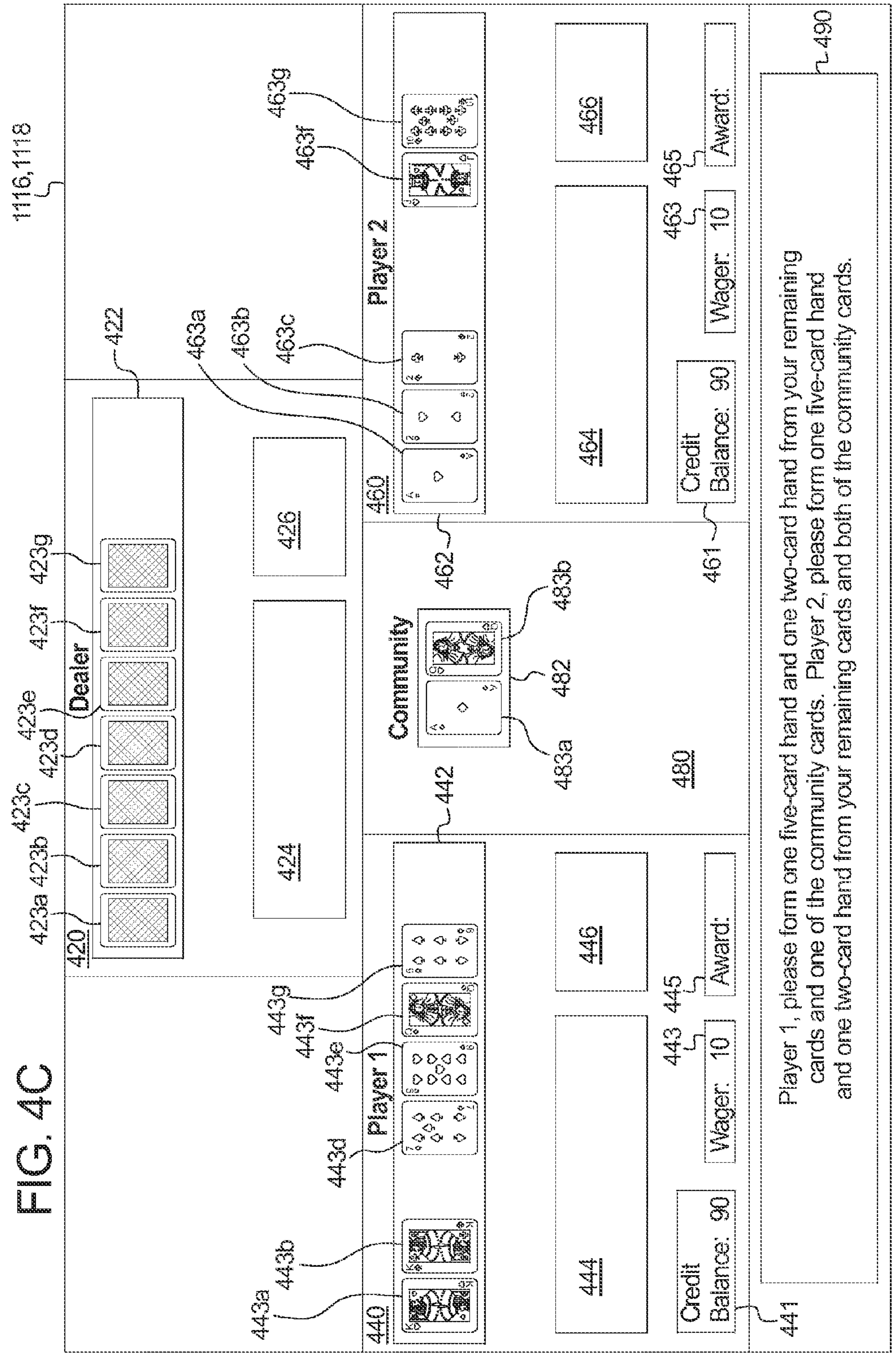

As illustrated in FIG. 4C, based on the received discard inputs, the gaming system removes card 443*c* from the first player set and removes cards 463*d* and 463*e* from the second player set. The gaming system selects two community cards 483*a*, which is the A♦, and 483*b*, which is the Q♥, from the plurality of cards. At this point, the gaming system enables each player to form a five-card hand and a two-card hand according to the applicable Pai-Gow Poker hand setting rules using the remaining cards of their respective player sets and at least one of the community cards. Specifically, in this example, since the first player discarded one card, the gaming system enables the first player to use one of the two community cards when forming the five and two-card hands. Since the second player discarded two cards, the gaming system enables the second player to use both of the community cards when forming the five and two-card hands. The gaming system displays the following message in message box 490: "PLAYER 1, PLEASE FORM ONE FIVE-CARD HAND AND ONE TWO-CARD HAND FROM YOUR REMAINING CARDS AND ONE OF THE COMMUNITY CARDS. PLAYER 2, PLEASE FORM ONE FIVE-CARD HAND AND ONE TWO-CARD HAND FROM YOUR REMAINING CARDS AND BOTH OF THE COMMUNITY CARDS."

Figure 4D:
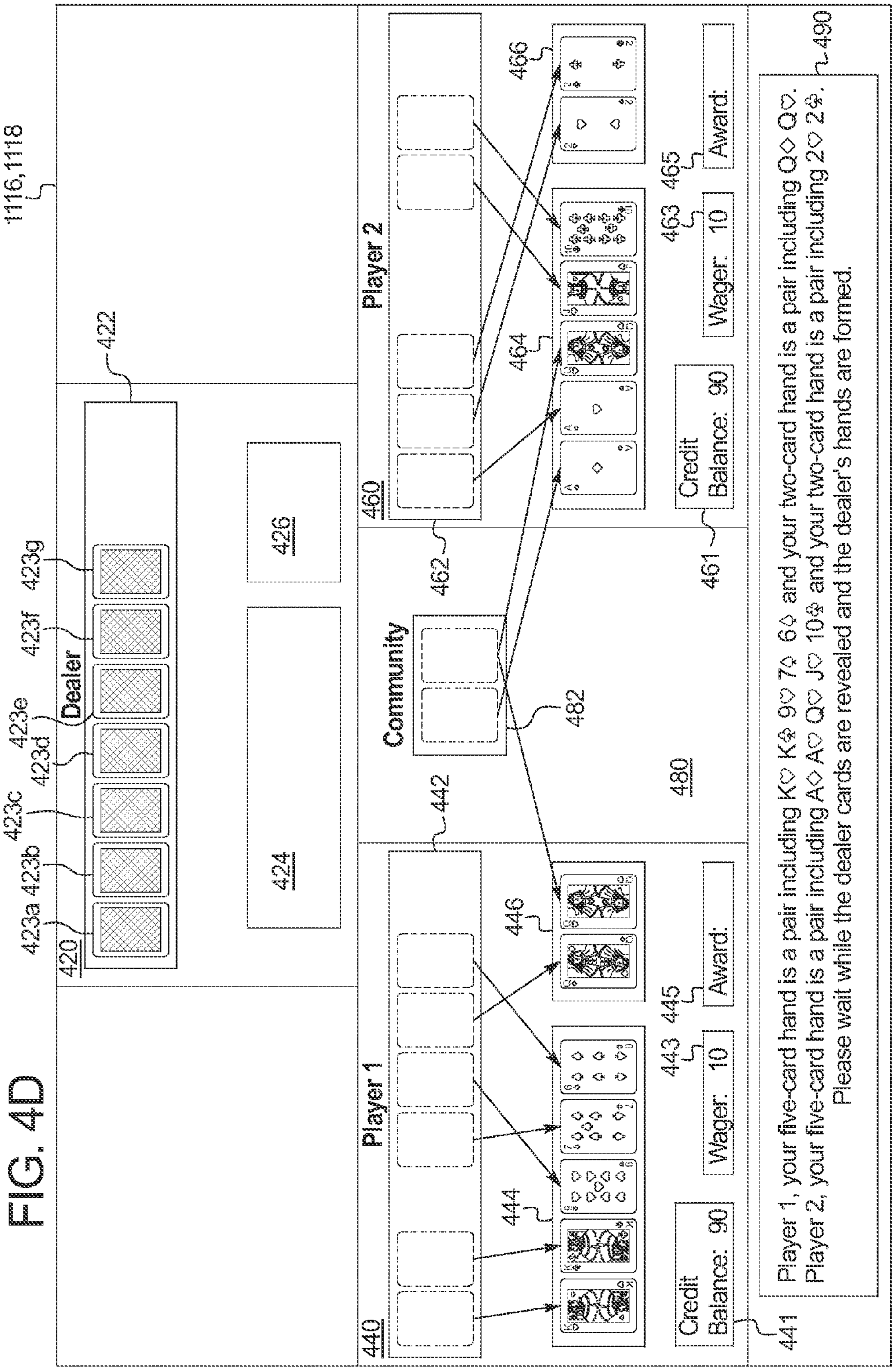

As illustrated in FIG. 4D, the gaming system receives hand formation inputs from the first player associated with the remaining cards of the first player set and one of the community cards, and forms the first player's five-card and two-card hands using the remaining cards of the first player set and that community card based on the received hand formation inputs. More specifically, in this example, the gaming system forms the first player's five-card hand from cards 443*a*, 443*b*, 443*e*, 443*d*, and 443*g*, and forms the first player's two-card hand from cards 443*f* and 483*b*. The gaming system displays the first player's five-card hand of K♥ K♣ 9♥ 7♠ 6♠ in five-card first player hand display area 444, and displays the first player's two-card hand of Q♦ Q♥ in two-card first player hand display area 446.

The gaming system also receives hand formation inputs from the second player associated with the remaining cards of the second player set and both of the community cards, and forms the second player's five-card and two-card hands using the remaining cards of the second player set and the community cards based on the received hand formation inputs. More specifically, in this example, the gaming system forms the second player's five-card hand from cards 483*a*, 463*b*, 483*b*, 463*f*, and 463*g*, and forms the second player's two-card hand from cards 463*b* and 463*c*. The gaming system displays the second player's five-card hand of A♦ A♥ Q♥ J♥ 10♣ in five-card second player hand display area 464, and displays the second player's two-card hand of 2♥ 2♣ in two-card second player hand display area 646. The gaming system displays the following message in message box 490: "PLAYER 1, YOUR FIVE-CARD HAND IS A PAIR INCLUDING K♥ K♣ 9♥ 7♠ 6♠ AND YOUR TWO-CARD HAND IS A PAIR INCLUDING Q♦ Q♥. PLAYER 2, YOUR FIVE-CARD HAND IS A PAIR INCLUDING A♦ A♥ Q♥ J♥ 10♣ AND YOUR TWO-CARD HAND IS A PAIR INCLUDING 2♥ 2♣ . PLEASE WAIT WHILE THE DEALER'S CARDS ARE REVEALED AND THE DEALER'S HANDS ARE FORMED."

Figure 4E:
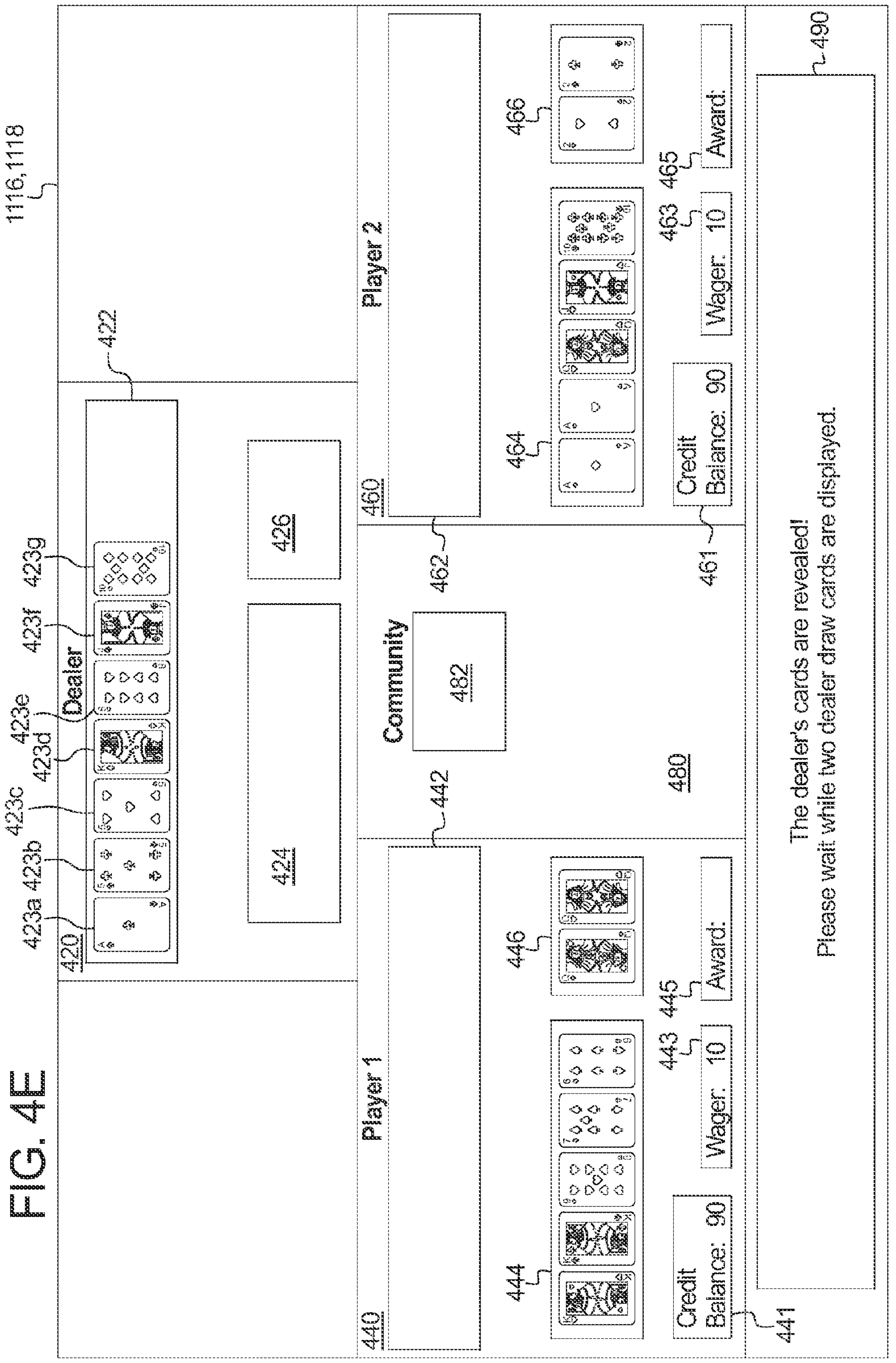

As illustrated in FIG. 4E, the gaming system reveals the cards of the dealer set. In this example, card 423*a* is the A♣ , card 423*b* is the 5♣ , card 423*c* is the 5♥, card 423*d* is the K ♠ , card 423*e* is the 8♥, card 423*f* is the J♣ , and card 423*g* is the 10♦. The gaming system selects two dealer draw cards from the plurality of cards and adds the dealer draw cards to the dealer set. The gaming system displays the following message in message box 490: "THE DEALER'S CARDS ARE REVEALED! PLEASE WAIT WHILE TWO DEALER DRAW CARDS ARE DISPLAYED."

Figure 4F:
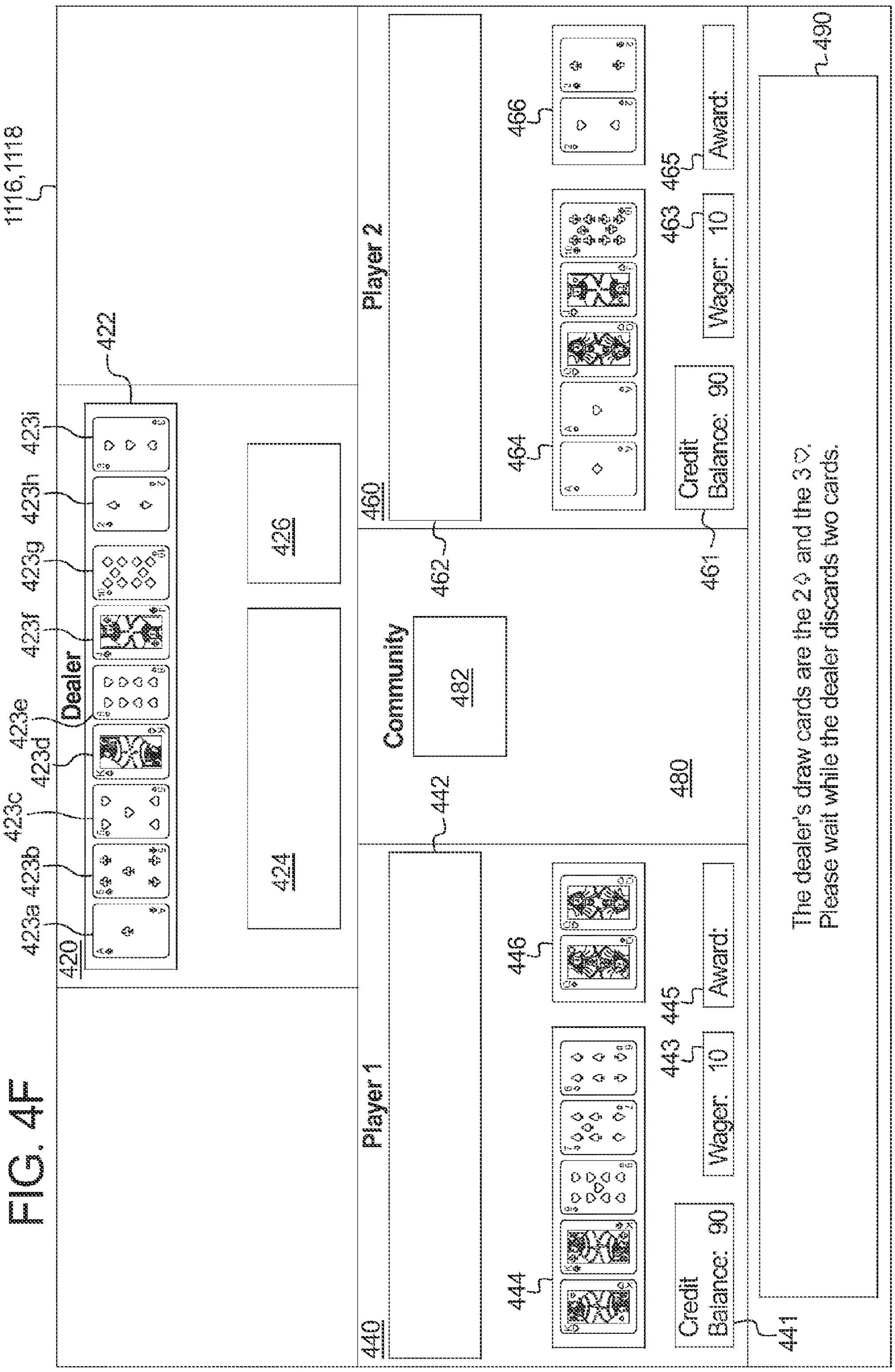

As illustrated in FIG. 4F, the gaming system selects dealer draw cards 423*h*, which is the 2♠ , and 423*i*, which is the 3♥, from the plurality of cards, and adds dealer draw cards 423*h* and 423*i* to the dealer set. The gaming system then discards two of the cards of the dealer set based on one or more predetermined rules or conditions. The gaming system displays the following message in message box 490: "THE DEALER'S DRAW CARDS ARE THE 2♠ AND THE 3♥. PLEASE WAIT WHILE THE DEALER DISCARDS TWO CARDS."

Figure 4G:
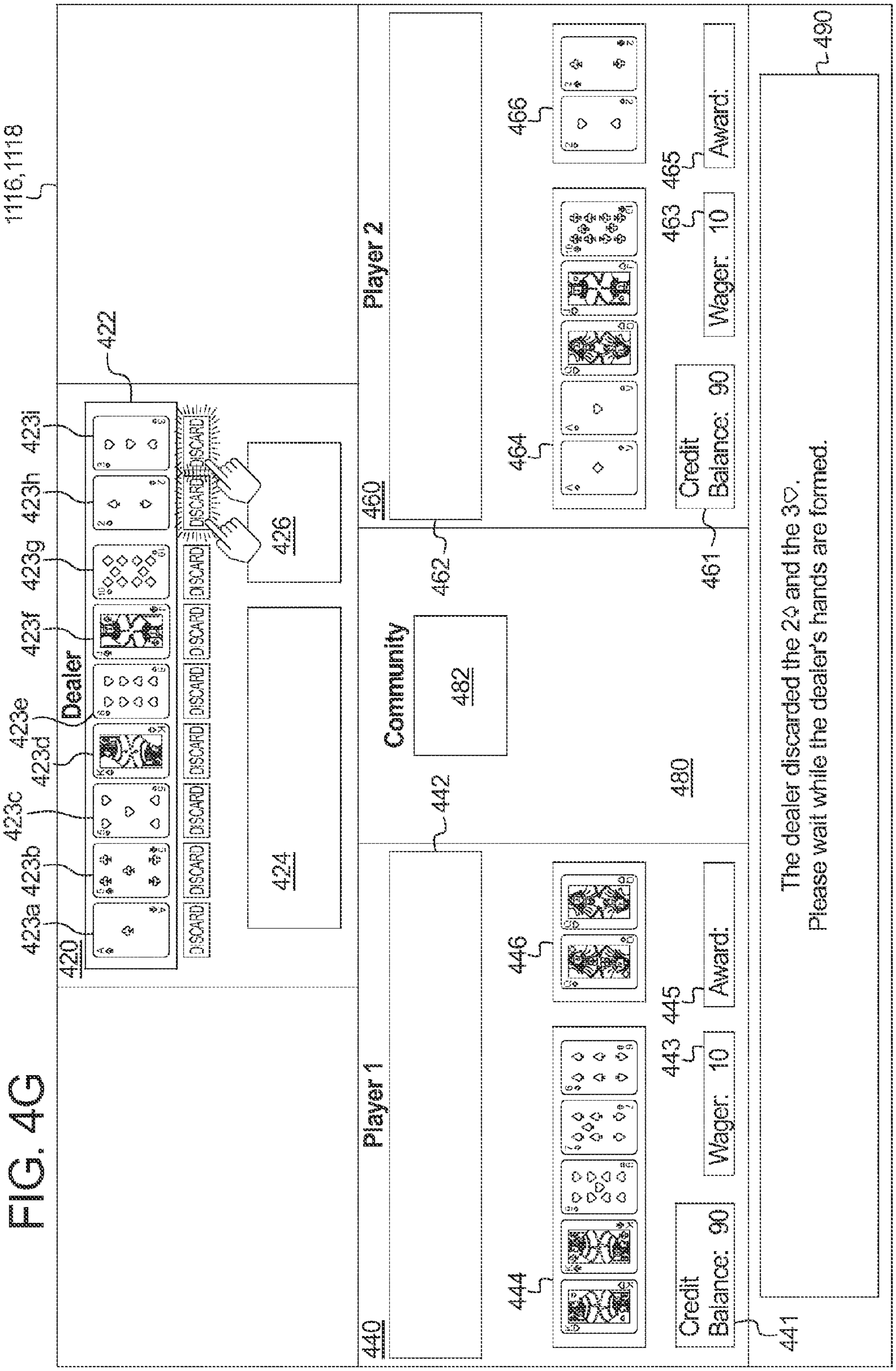

As illustrated in FIG. 4G, the gaming system discards cards 423*h* and 423*i*, which are the 2♠ and the 3♥, and removes cards 423*h* and 423*i* from the dealer set. The gaming system then forms a five-card hand and a two-card hand according to "House Way" rules. The gaming system displays the following message in message box 490: "THE DEALER DISCARDED THE 2♠ AND THE 3♥. PLEASE WAIT WHILE THE DEALER'S HANDS ARE FORMED."

Figure 4H:
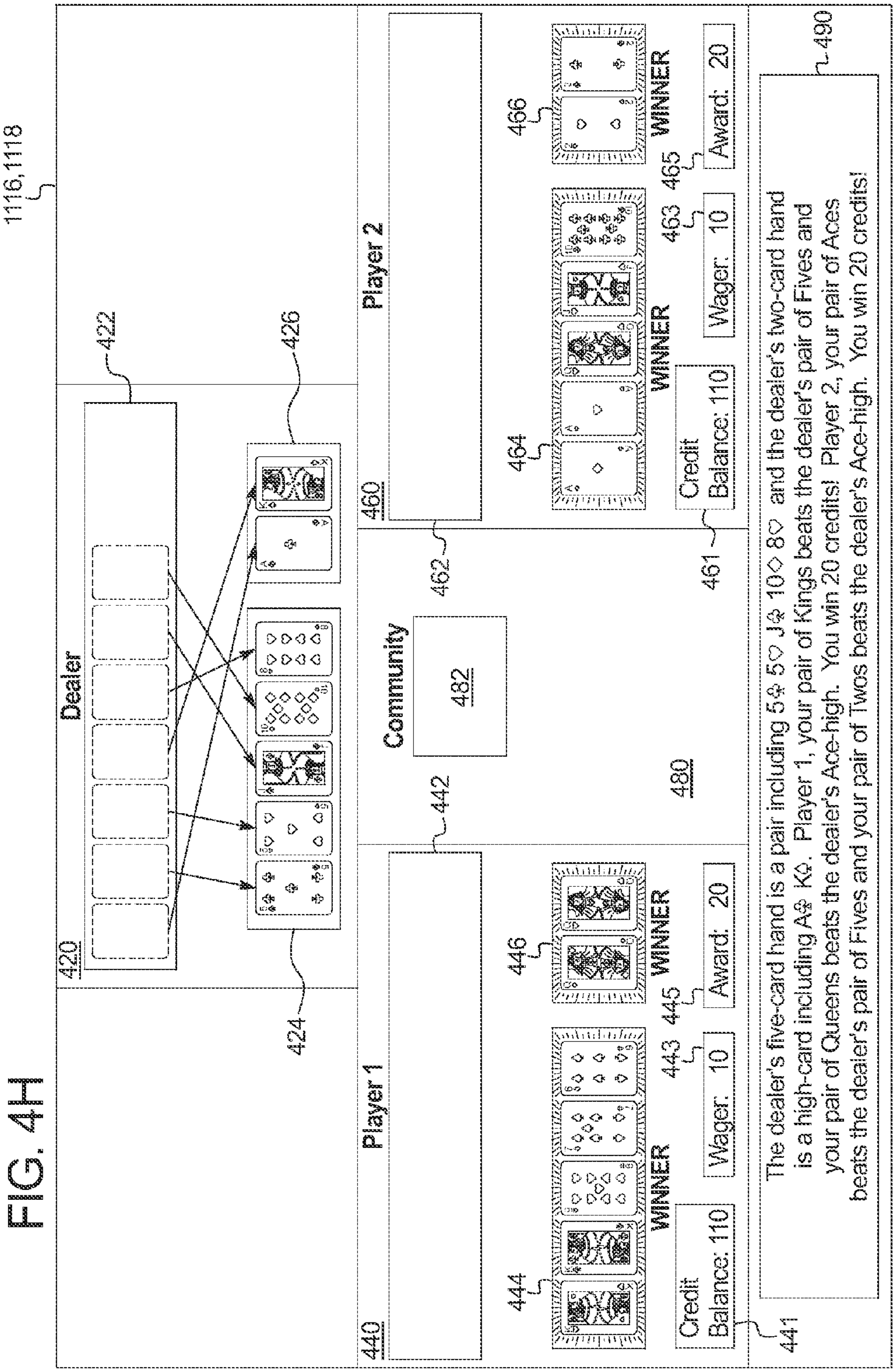

As illustrated in FIG. 4H, the gaming system employs the "House Way" rules to form the dealer's five-card hand from cards 423*b*, 423*c*, 423*f*, 423*g*, and 423*e*, and the dealer's two-card hand from cards 423*a* and 423*d*. The gaming system displays the dealer's five-card hand of 5♣ 5♥ J♣ 10♦ 8♥ in five-card dealer hand display area 424, and displays the dealer's two-card hand of A♣ K♠ in two-card dealer hand display area 446. The gaming system determines that the first player's five-card hand has a higher rank than a rank of the dealer's five-card hand (i.e., a pair of Kings ranks higher than a pair of Fives) and, therefore, that the first player's five-card hand beats the dealer's five-card hand. The gaming system also determines that the first player's two-card hand has a higher rank than a rank of the dealer's two-card hand (i.e., a pair of Queens ranks higher than an Ace-high) and, therefore that the first player's two-card hand beats the dealer's two-card hand. Since each of the first player's hands beat its respective dealer hand, the gaming system determines an award of 20 credits (i.e., pays out 1:1 based on the player's wager). The gaming system displays the 20 credit award in first player award meter 445 and updates the first player's credit balance to reflect the 20 credit award (i.e., updates the first player's credit balance from 90 credits to 110 credits to reflect the 20 credit award).

Additionally, the gaming system determines that the second player's five-card hand has a higher rank than a rank of the dealer's five-card hand (i.e., a pair of Aces ranks higher than a pair of Fives) and, therefore, that the second player's five-card hand beats the dealer's five-card hand. The gaming system also determines that the second player's two-card hand has a higher rank than a rank of the dealer's two-card hand (i.e., a pair of Twos ranks higher than an Ace-high) and, therefore that the first player's two-card hand beats the dealer's two-card hand. Since each of the second player's hands beat its respective dealer hand, the gaming system determines an award of 20 credits (i.e., pays out 1:1 based on the player's wager). The gaming system displays the 20 credit award in second player award meter 645 and updates the second player's credit balance to reflect the 20 credit award (i.e., updates the second player's credit balance from 90 credits to 110 credits to reflect the 20 credit award).

The gaming system displays the following message in message box 260: "THE DEALER'S FIVE-CARD HAND IS A PAIR INCLUDING 5♣ 5♥ J♣ 10♦ 8♥ AND THE DEALER'S TWO-CARD HAND IS A HIGH-CARD INCLUDING A♣ K♠. PLAYER 1, YOUR PAIR OF KINGS BEATS THE DEALER'S PAIR OF FIVES AND YOUR PAIR OF QUEENS BEATS THE DEALER'S ACE-HIGH! YOU WIN 20 CREDITS! PLAYER 2, YOUR PAIR OF ACES BEATS THE DEALER'S PAIR OF FIVES AND YOUR PAIR OF TWOS BEATS THE DEALER'S ACE-HIGH! YOU WIN 20 CREDITS!"

In certain embodiments, if the player (or the dealer) discards fewer than the designated quantity of cards, the gaming system enables the player (or the dealer) to use any of the community cards (up to the quantity of cards discarded) to form the player's (or the dealer's) hands. In other embodiments, if the player (or the dealer) discards fewer than the designated quantity of cards, the gaming system requires the player (or the dealer) to use a designated set of the community cards, such as the first community cards dealt (up to the quantity of cards discarded) or the final community cards dealt (up to the quantity of cards discarded) to form the player's (or the dealer's) hands.

In one embodiment employing community cards, the gaming system provides a player who discards at least one card with a placeholder card for each discarded card. Each placeholder card represents one of the community cards. The gaming system enables the player to use each placeholder card when forming the player's hands to explicitly substitute the associated community card for a discarded card. For instance, in one example, the gaming system provides the player a yellow card when the player discards a first card, and a striped blue card when the player discards a second card. In this example, the yellow card is associated with a first community card and the striped blue card is associated with a second community card. The gaming system enables the player to form the player's hands using the yellow and the striped blue cards to explicitly substitute their associated community cards for the discarded cards.

In certain embodiments in which the card game is a Pai Gow draw poker game, the gaming system provides the player and/or the dealer with an automatic hand setting option that, if selected, causes the gaming system to automatically set the player's five-card and two-card hands and/or the dealer's five-card and two-card hands in accordance with the applicable "House Way" rules, in an optimal manner, or in accordance with any other set of rules as generally described in U.S. Pat. No. 8,216,039.

It should be appreciated that, in different embodiments, one or more of:

(1) the order in which cards are discarded from and added to the player set;
(2) the order in which cards are discarded from and added to the dealer set;
(3) the quantity of cards of the player set displayed face-up before enabling the player to choose which card(s) (if any) to discard from the player set;
(4) the quantity of cards up to which the player may discard from the player set;
(5) the quantity of cards up to which the dealer may discard from the dealer set;
(6) whether community draw cards or individual sets of draw cards are used for the player and the dealer;
(7) whether a commission, vigorish, or "vig" is withheld from any determined awards;
(8) the quantity of cards in the player set;
(9) the quantity of cards in the dealer set;
(10) the quantity of cards in each of the player hands;
(11) the quantity of cards in each of the dealer hands; and
(12) any employed house rules;

is/are: (1) predetermined; (2) randomly determined; (3) randomly determined based on one or more weighted percentages; (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an electronic gaming machine (EGM) configured to operate the slot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager; (17) determined independent of the player's primary game wager; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (e.g., a player tracking status); (23) determined independent of a status of the player (e.g., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 5A:
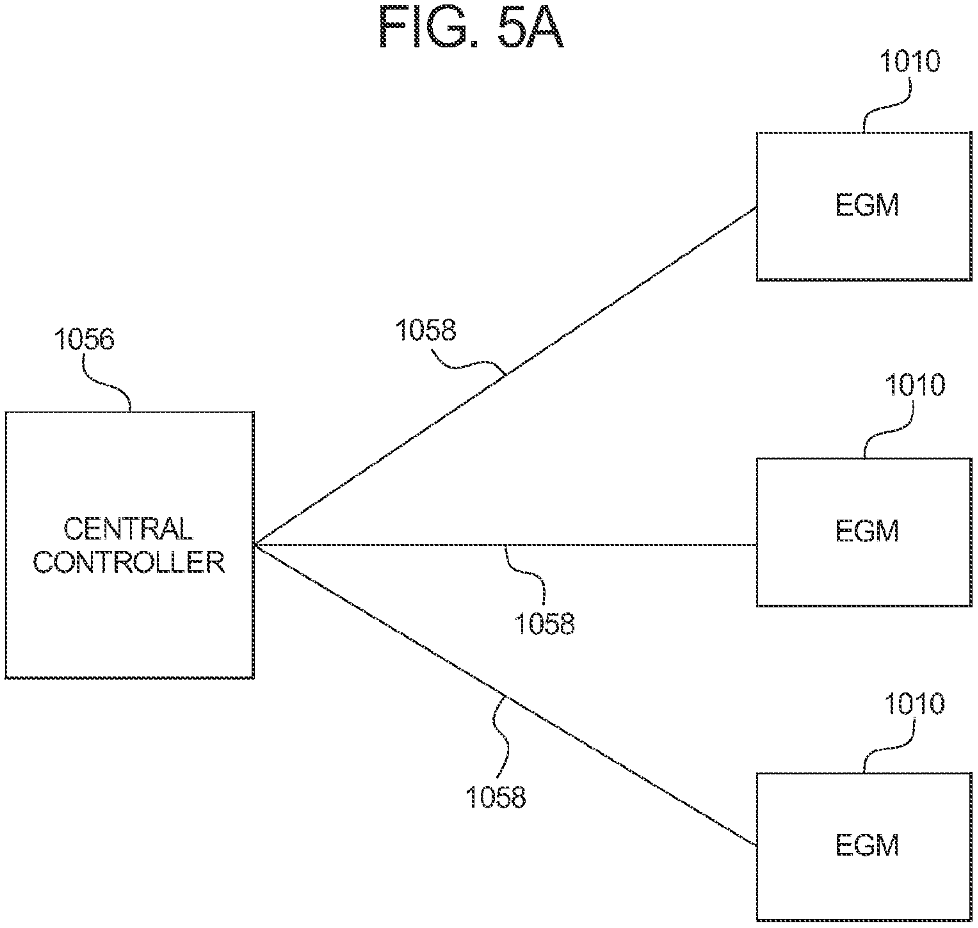
FIG. 5A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 5A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 5B:
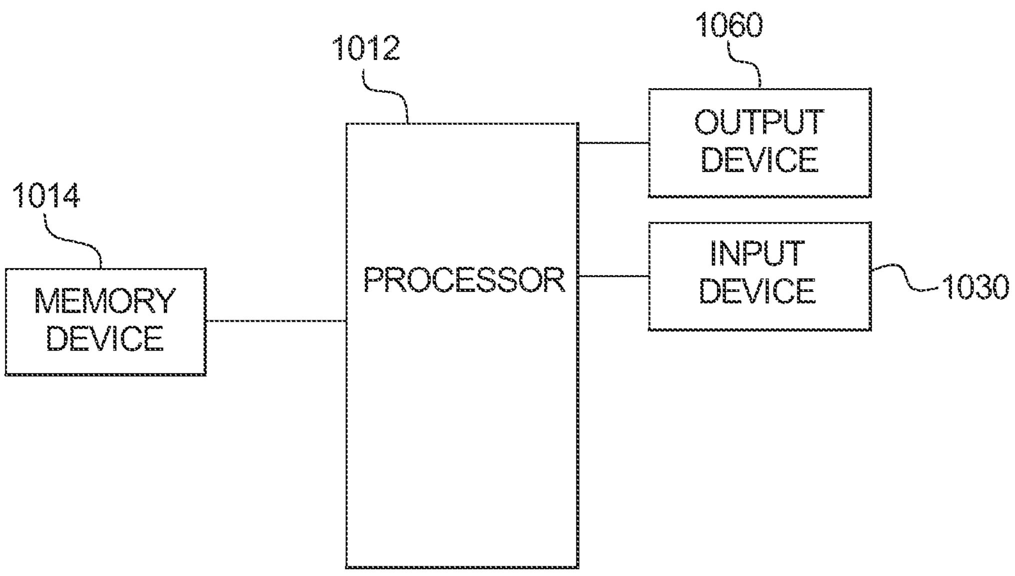
FIG. 5B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 5B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 5B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 6A:
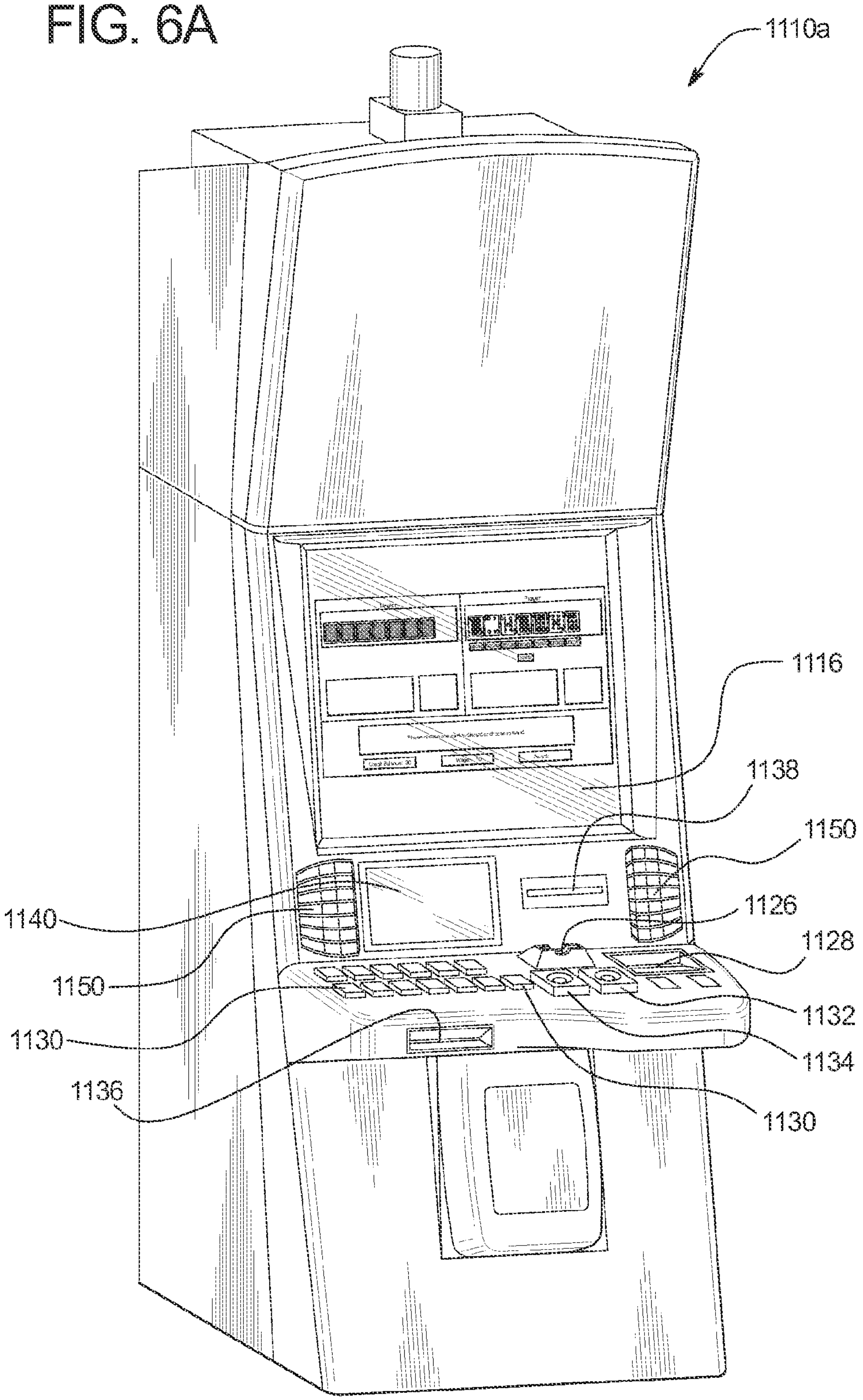
FIGS. 6A and 6B are perspective views of example alternative embodiments of the gaming system of the present disclosure.
Figure 6B:
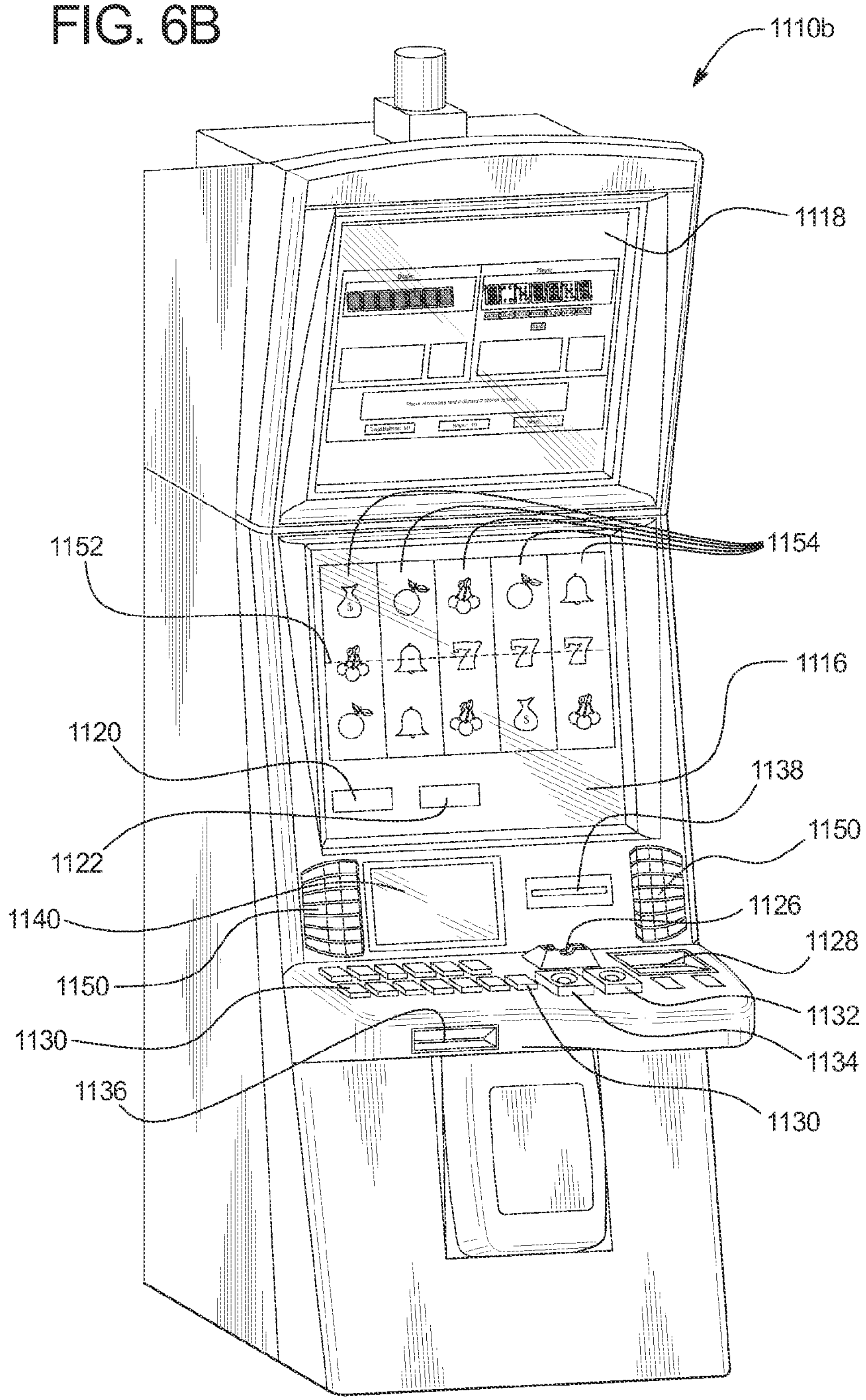

In various embodiments, the EGM includes one or more input devices. The input devices may include any suitable device that enables an input signal to be produced and received by the at least one processor of the EGM. The example EGM illustrated in FIG. 5B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 6A and 6B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 6A and 6B each include a game play activation device in the form of a game play initiation button 1132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 6A and 6B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 6A and 6B each include a card reader 1138. The card reader is configured to read a player identification card inserted into the card reader.

In various embodiments, the EGM includes one or more output devices. The example EGM illustrated in FIG. 5B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 5A includes a central display device 1116, a player tracking display 1140, a credit display 1120, and a bet display 1122. The example EGM illustrated in FIG. 5B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 6A and 6B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 6A and 6B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 6A and 6B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 6A and 6B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM shown in FIG. 6B each includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 200710123341, 200810070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor;

at least one display device;

at least one input device; and at least one memory device storing a plurality of instructions which, when executed by the at least one processor, cause the at least one processor to operate with the at least one display device and the at least one input device, for a play of a card game, to:

(a) determine a player set of at least two cards from a plurality of cards;

(b) display face-up the cards of the player set;

(c) determine a dealer set of at least two cards from the plurality of cards;

(d) receive, from a player, a first discard input associated with at least one of the cards of the player set;

(e) replace each card of the player set associated with the received first discard input with a player draw card from the plurality of cards to create a final player set including any cards of the player set that were not discarded and any player draw cards;

(f) receive, from the player, first hand formation inputs associated with the cards of the final player set, and form a first player hand having a first quantity of cards and a second player hand having a second quantity of cards using the cards of the final player set based on the received first hand formation inputs;

(g) display face-up the cards of the dealer set;

(h) add a third quantity of one or more dealer draw cards from the plurality of cards to the dealer set to form a second dealer set;

(i) discard a fourth of quantity of one or more cards from the second dealer set to create a final dealer set, wherein the fourth quantity and the third quantity are the same;

(j) form a first dealer hand having the first quantity of cards and a second dealer hand having the second quantity of cards using the cards of the final dealer set;

(k) determine any awards based on a comparison of the first and second player hands with the first and second dealer hands; and (l) display and provide any determined awards.

2. The gaming system of claim 1, wherein the plurality of instructions, when executed by the at least one processor, cause the at least one processor to operate with the at least one input device to receive, from the player, the first discard input before displaying any player draw cards face-up.

3. The gaming system of claim 1, wherein the plurality of instructions, when executed by the at least one processor, cause the at least one processor to operate with the at least one input device to receive, from the player, the first discard input after displaying the at least one player draw card face-up.

4. The gaming system of claim 1, wherein the plurality of instructions, when executed by the at least one processor, cause the at least one processor to operate with the at least one display device to add the third quantity of one or more dealer draw cards to the dealer set before discarding any of the cards from the dealer set.

5. The gaming system of claim 1, wherein the plurality of instructions, when executed by the at least one processor, cause the at least one processor to operate with the at least one display device to add the third quantity of one or more dealer draw cards to the dealer set after discarding at least one of the cards from the dealer set.

6. The gaming system of claim 1, wherein each player draw card is one of a quantity of community cards, said quantity of community cards being at least one.

7. The gaming system of claim 6, wherein the plurality of instructions, when executed by the at least one processor, cause the at least one processor to operate with the at least one input device to receive an indication of one of the community cards and select at least one player draw card based on said received indication.

8. The gaming system of claim 6, wherein each of the third quantity of one or more dealer draw cards is one of the quantity of community cards.

9. A method of operating a gaming system, said method comprising:

for a play of a card game:

(a) causing at least one processor to execute a plurality of instructions stored in at least one memory device to determine a player set of at least two cards from a plurality of cards;

(b) causing the at least one processor to execute the plurality of instructions to operate with at least one display device to display face-up the cards of the player set;

(c) causing the at least one processor to execute the plurality of instructions to determine a dealer set of at least two cards from the plurality of cards;

(d) causing the at least one processor to execute the plurality of instructions to operate with at least one input device to receive, from a player, a first discard input associated with at least one of the cards of the player set;

(e) causing the at least one processor to execute the plurality of instructions to operate with the at least one display device to replace each card of the player set associated with the received first discard input with a player draw card from the plurality of cards to create a final player set including any cards of the player set that were not discarded and any player draw cards;

(f) causing the at least one processor to execute the plurality of instructions to operate with the at least one input device to receive, from the player, first hand formation inputs associated with the cards of the final player set, and form a first player hand having a first quantity of cards and a second player hand having a second quantity of cards using the cards of the final player set based on the received first hand formation inputs;

(g) causing the at least one processor to execute the plurality of instructions to operate with the at least one display device to display face-up the cards of the dealer set;

(h) causing the at least one processor to execute the plurality of instructions to operate with the at least one display device to add a third quantity of one or more dealer draw cards from the plurality of cards to the dealer set to form a second dealer set;

(i) causing the at least one processor to execute the plurality of instructions to operate with the at least one display device to discard a fourth of quantity of one or more cards from the second dealer set to create a final dealer set, wherein the fourth quantity and the third quantity are the same;

(j) causing the at least one processor to execute the plurality of instructions to form a first dealer hand having the first quantity of cards and a second dealer hand having the second quantity of cards using the cards of the final dealer set;

(k) causing the at least one processor to execute the plurality of instructions to determine any awards based on a comparison of the first and second player hands with the first and second dealer hands;

(l) causing the at least one processor to execute the plurality of instructions to operate with the at least one display device to display any determined awards; and (m) providing any determined awards.

10. The method of claim 9, which includes causing the at least one processor to execute the plurality of instructions to operate with the at least one input device to receive, from the player, the first discard input before displaying any player draw cards face-up.

11. The method of claim 9, which includes causing the at least one processor to execute the plurality of instructions to operate with the at least one input device to receive, from the player, the first discard input after displaying the at least one player draw card face-up.

12. The method of claim 9, which includes causing the at least one processor to execute the plurality of instructions to operate with the at least one display device to add the third quantity of one or more dealer draw cards to the dealer set before discarding any of the cards from the dealer set.

13. The method of claim 9, which includes causing the at least one processor to execute the plurality of instructions to operate with the at least one display device to add the third quantity of one or more dealer draw cards to the dealer set after discarding at least one of the cards from the dealer set.

14. The method of claim 9, wherein each player draw card is one of a quantity of community cards, said quantity of community cards being at least one.

15. The method of claim 14, which includes causing the at least one processor to execute the plurality of instructions to operate with the at least one input device to receive an indication of one of the community cards and select at least one player draw card based on said received indication.

16. The gaming system of claim 14, wherein each of the third quantity of one or more dealer draw cards is one of the quantity of community cards.

17. The method of claim 9, which is provided through a data network.

18. The method of claim 17, wherein the data network is an internet.

19. A non-transitory computer readable medium storing a plurality of instructions which, when executed by at least one processor, cause the at least one processor to:

for a play of a card game:

(a) determine a player set of at least two cards from a plurality of cards;

(b) cause at least one display device to display face-up the cards of the player set;

(c) determine a dealer set of at least two cards from the plurality of cards;

(d) operate with at least one input device to receive, from a player, a first discard input associated with at least one of the cards of the player set;

(e) cause the at least one display device to replace each card of the player set associated with the received first discard input with a player draw card from the plurality of cards to create a final player set including any cards of the player set that were not discarded and any player draw cards;

(f) operate with the at least one input device to receive, from the player, first hand formation inputs associated with the cards of the final player set, and form a first player hand having a first quantity of cards and a second player hand having a second quantity of cards using the cards of the final player set based on the received first hand formation inputs;

(g) cause the at least one display device to display face-up the cards of the dealer set;

(h) cause the at least one display device to add a third quantity of one or more dealer draw cards from the plurality of cards to the dealer set to form a second dealer set;

(i) cause the at least one display device to discard a fourth of quantity of one or more cards from the second dealer set to create a final dealer set, wherein the fourth quantity and the third quantity are the same;

(j) form a first dealer hand having the first quantity of cards and a second dealer hand having the second quantity of cards using the cards of the final dealer set;

(k) determine any awards based on a comparison of the first and second player hands with the first and second dealer hands;

(l) cause the at least one display device to display any determined awards; and (m) provide any determined awards.

20. The non-transitory computer readable medium of claim 19, wherein the plurality of instructions, when executed by the at least one processor, cause the at least one processor to operate with the at least one input device to receive, from the player, the first discard input before displaying any player draw cards face-up.

21. The non-transitory computer readable medium of claim 19, wherein the plurality of instructions, when executed by the at least one processor, cause the at least one processor to operate with the at least one input device to receive, from the player, the first discard input after displaying the at least one player draw card face-up.

22. The non-transitory computer readable medium of claim 19, wherein the plurality of instructions, when executed by the at least one processor, cause the at least one processor to cause the at least one display device to add the third quantity of one or more dealer draw cards to the dealer set before discarding any of the cards from the dealer set.

23. The non-transitory computer readable medium of claim 19, wherein the plurality of instructions, when executed by the at least one processor, cause the at least one processor to cause the at least one display device to add the third quantity of one or more dealer draw cards to the dealer set after discarding at least one of the cards from the dealer set.

24. The non-transitory computer readable medium of claim 19, wherein each player draw card is one of a quantity of community cards, said quantity of community cards being at least one.

25. The non-transitory computer readable medium of claim 24, wherein the plurality of instructions, when executed by the at least one processor, cause the at least one processor to operate with the at least one input device to receive an indication of one of the community cards and select at least one player draw card based on said received indication.

26. The non-transitory computer readable medium of claim 24, wherein each of the third quantity of one or more dealer draw cards is one of the quantity of community cards.

* * * * *